US009706476B2

(12) United States Patent
Zhi et al.

(10) Patent No.: US 9,706,476 B2
(45) Date of Patent: Jul. 11, 2017

(54) METHOD FOR OBTAINING RADIO ACCESS NETWORK INFORMATION AND RADIO ACCESS NETWORK CONTROLLER

(71) Applicant: HUAWEI TECHNOLOGIES CO., LTD., Shenzhen (CN)

(72) Inventors: Yuliang Zhi, Tianjin (CN); Yanyan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/729,488

(22) Filed: Jun. 3, 2015

(65) Prior Publication Data
US 2015/0264632 A1    Sep. 17, 2015

Related U.S. Application Data

(63) Continuation of application No. PCT/CN2013/073650, filed on Apr. 2, 2013.

(30) Foreign Application Priority Data

Dec. 3, 2012  (WO) ................ PCT/CN2012/085761

(51) Int. Cl.
*H04W 48/08* (2009.01)
*H04W 88/12* (2009.01)
*H04W 48/16* (2009.01)

(52) U.S. Cl.
CPC ........... *H04W 48/08* (2013.01); *H04W 48/16* (2013.01); *H04W 88/12* (2013.01)

(58) Field of Classification Search
CPC ... H04W 84/045; H04W 88/16; H04W 88/08; H04W 76/02; H04W 12/06; H04W 92/02;
(Continued)

(56) References Cited

U.S. PATENT DOCUMENTS

2008/0261563 A1* 10/2008 Drevon ............... H04W 92/045
455/411
2010/0130207 A1* 5/2010 Wu .................... H04W 36/0066
455/436
(Continued)

FOREIGN PATENT DOCUMENTS

CN    101754296         6/2010
CN    101754296 A  *  6/2010  ............ H04W 36/00
(Continued)

OTHER PUBLICATIONS

International Search Report mailed Aug. 29, 2013 in corresponding international application PCT/CN2013/073650.
(Continued)

*Primary Examiner* — Nizar Sivji
(74) *Attorney, Agent, or Firm* — Staas & Halsey LLP

(57) ABSTRACT

The present invention provides a method for obtaining radio access network information and a radio access network controller. The method for obtaining radio access network information includes: receiving, by a second radio access network controller, first radio access network information request information from a first radio access network controller, where the first radio access network information request information is used to request radio access network information of a third radio access network controller; and sending, by the second radio access network controller, target radio access network information to the first radio access network controller. The method reduces resource waste, improves a resource utilization rate and reduces a burden on a source core network entity and a target core network entity.

28 Claims, 8 Drawing Sheets

(58) Field of Classification Search
CPC .............. H04W 92/045; H04W 92/20; H04W 72/0406; H04W 72/0426; H04W 48/08; H04W 48/16; H04W 88/12; H04M 7/1235

See application file for complete search history.

(56) References Cited

U.S. PATENT DOCUMENTS

| | | | | |
|---|---|---|---|---|
| 2011/0171953 A1* | 7/2011 | Faccin | .................. | H04W 48/08 455/426.1 |
| 2011/0205970 A1 | 8/2011 | Suzuki et al. | | |
| 2012/0028645 A1* | 2/2012 | Kim | ..................... | H04W 48/06 455/444 |
| 2013/0150021 A1* | 6/2013 | Oh | ...................... | H04W 88/16 455/422.1 |
| 2013/0184004 A1* | 7/2013 | Nishida | ................. | H04W 24/02 455/456.1 |
| 2013/0195268 A1* | 8/2013 | Norrman | ............... | H04W 12/04 380/247 |
| 2015/0024765 A1* | 1/2015 | Xu | ....................... | H04W 92/20 455/450 |
| 2015/0139195 A1* | 5/2015 | Xiao | .................... | H04W 36/22 370/332 |

FOREIGN PATENT DOCUMENTS

| | | |
|---|---|---|
| CN | 102685778 | 9/2012 |
| CN | 102695290 | 9/2012 |
| EP | 2 846 576 A1 | 3/2015 |

OTHER PUBLICATIONS

*3rd Generation Partnership Project; Technical Specification Group Radio Access Network; Evolved Universal Terrestrial Radio Access Network (E-UTRAN); S1 Application Protocol (S1AP) (Release 11) 3GPP TS 36.413 V11.1.0 (Sep. 2012)*), 3rd Generation Partnership Project (3GPP™), Sep. 2012, pp. 1-262.
*3rd Generation Partnership Project; Technical Specification Group Radio Access Network; UTRAN Iu interface Radio Access Network Application Part (RANAP) signalling (Release 11) (3GPP TS 25.413 V11.1.0 (Sep. 2012)*), 3rd Generation Partnership Project (3GPP™), Sep. 2012, pp. 1-430.
International Search Report mailed Aug. 29, 2013 for corresponding International Patent Application No. PCT/CN2012/085761.
International Search Report mailed Aug. 29, 2013 for corresponding International Patent Application No. PCT/CN2013/073650.

* cited by examiner

METHOD FOR OBTAINING RADIO ACCESS NETWORK INFORMATION AND RADIO ACCESS NETWORK CONTROLLER

CROSS-REFERENCE TO RELATED APPLICATIONS

This application is a continuation of International Application No. PCT/CN2013/073650, filed on Apr. 2, 2013, which claims priorities to International Application No. PCT/CN2012/085761, filed on Dec. 3, 2012, both of which are hereby incorporated by reference in their entireties.

TECHNICAL FIELD

Embodiments of the present invention relate to a communications technology and in particular, to a method for obtaining radio access network information and a radio access network controller.

BACKGROUND

In an existing communication process, radio access network controllers need to exchange radio access network information thereof frequently with each other for better communication. Radio access network controllers of different radio access network standards need to exchange radio access network information thereof with each other by using a core network entity. Specifically, a source radio access network controller sends radio access network information request information to a target core network entity by using a source core network entity; the target core network entity sends the radio access network information request information to a target radio access network controller; and the target radio access network controller sends target radio access network information to the source radio access network controller by using the target core network entity and the source core network entity.

One core network entity normally is connected to multiple radio access network controllers. If multiple source radio access network controllers request the same radio access network information of the same target radio access network controller, the source core network entity and the target core network entity need to repeatedly transmit the radio access network information multiple times. This definitely causes resource waste and increases a signaling processing burden on the source core network entity and the target core network entity.

SUMMARY

Embodiments of the present invention provide a method for obtaining radio access network information and a radio access network controller, so as to reduce a burden on a source core network entity and a target core network entity.

According to a first aspect, a method for obtaining radio access network information is provided, including:

receiving, by a second radio access network controller, first radio access network information request information from a first radio access network controller, where the first radio access network information request information is used to request target radio access network information; the target radio access network information is radio access network information of a third radio access network controller; the first radio access network controller is an access network node of a first radio access network standard and the third radio access network controller is an access network node of a second radio access network standard; and sending, by the second radio access network controller, the target radio access network information to the first radio access network controller.

In a first possible implementation manner of the first aspect, before the sending, by the second radio access network controller, the target radio access network information to the first radio access network controller, the method further includes:

sending, by the second radio access network controller, second radio access network information request information to the third radio access network controller and receiving, by the second radio access network controller, the target radio access network information from the third radio access network controller.

With reference to the first aspect or the first possible implementation manner of the first aspect, in a second possible implementation manner of the first aspect, the first radio access network information request information further carries sending mode indication information for indicating a mode for the second radio access network controller to send the target radio access network information to the first radio access network controller; and the sending, by the second radio access network controller, the target radio access network information to the first radio access network controller includes:

sending, by the second radio access network controller according to an instruction of the sending mode indication information, the target radio access network information to the first radio access network controller.

With reference to the second possible implementation manner of the first aspect, in a third possible implementation manner of the first aspect, the sending, by the second radio access network controller according to an instruction of the sending mode indication information, the target radio access network information to the first radio access network controller includes:

sending, by the second radio access network controller according to the instruction of the sending mode indication information, the target radio access network information to the first radio access network controller at any moment; or sending, by the second radio access network controller according to the instruction of the sending mode indication information, the target radio access network information to the first radio access network controller only once; or sending, by the second radio access network controller according to the instruction of the sending mode indication information, the target radio access network information to the first radio access network controller when a change occurs on the radio access network information of the third radio access network controller; or sending, by the second radio access network controller according to the instruction of the sending mode indication information, the target radio access network information to the first radio access network controller periodically.

With reference to the first aspect and any possible implementation manner of the first to the third possible implementation manner of the first aspect, in a fourth possible implementation manner of the first aspect, the second radio access network controller is an access network node of the first radio access network standard; or the second radio access network controller is an access network node of the second radio access network standard; or the second radio access network controller is an intermediate node between the first radio access network controller and the third radio access network controller and the second radio access network controller performs centralized control and management on radio resources of the first radio access network standard and the second radio access network standard.

With reference to the fourth possible implementation manner of the first aspect, in a fifth possible implementation manner of the first aspect, the first radio access network controller is directly connected to the second radio access network controller by using an interface for a connection between access network nodes of the first radio access network standard; or the first radio access network controller is connected to the second radio access network controller by using an interface for a connection between an access network node and a core network node that are of the first radio access network standard.

With reference to the fourth possible implementation manner of the first aspect or the fifth possible implementation manner of the first aspect, in a sixth possible implementation manner of the first aspect, the third radio access network controller is connected to the second radio access network controller by using an interface for a connection between access network nodes of the second radio access network standard; or the third radio access network controller is connected to the second radio access network controller by using an interface for a connection between an access network node and a core network node that are of the second radio access network standard.

With reference to the first aspect and any possible implementation manner of the first to the sixth possible implementation manner of the first aspect, in a seventh possible implementation manner of the first aspect, the first radio access network information request information further carries type indication information for indicating a type of the target radio access network information.

With reference to the first aspect and any possible implementation manner of the first to the seventh possible implementation manner of the first aspect, in an eighth possible implementation manner of the first aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the first aspect and any possible implementation manner of the first to the eighth possible implementation manner of the first aspect, in a ninth possible implementation manner of the first aspect, the first radio access network information request information is carried in a common measurement request message, a resource status request message, a direct information transmission message, or a direct information transmission message of an evolved base station; or the second radio access network information request information is carried in a common measurement request message, a resource status request message, a direct information transmission message, or a direct information transmission message of an evolved base station.

With reference to the first aspect and any possible implementation manner of the first to the ninth possible implementation manner of the first aspect, in a tenth possible implementation manner of the first aspect, the target radio access network information is carried in a common measurement response message, a common measurement report message, a resource status response message, a resource status update message, or a direct transmission message of a mobility management entity.

According to a second aspect, a method for obtaining radio access network information is provided, including:

sending, by a first radio access network controller, first radio access network information request information to a second radio access network controller, where the first radio access network information request information is used to request target radio access network information; the target radio access network information is radio access network information of a third radio access network controller; the first radio access network controller is an access network node of a first radio access network standard; and the third radio access network controller is an access network node of a second radio access network standard; and receiving, by the first radio access network controller, the target radio access network information from the second radio access network controller.

In a first possible implementation manner of the second aspect, the first radio access network information request information carries sending mode indication information for indicating a mode for the second radio access network controller to send the target radio access network information to the first radio access network controller; and the receiving, by the first radio access network controller, the target radio access network information from the second radio access network controller includes:

receiving, by the first radio access network controller, the target radio access network information that is from the second radio access network controller according to an instruction of the sending mode indication information.

With reference to the second aspect or the first possible implementation manner of the second aspect, in a second possible implementation manner of the second aspect, the second radio access network controller is an access network node of the first radio access network standard; or the second radio access network controller is an access network node of the second radio access network standard; or the second radio access network controller is an intermediate node between the first radio access network controller and the third radio access network controller and the second radio access network controller performs centralized control and management on radio resources of the first radio access network standard and the second radio access network standard.

With reference to the second possible implementation manner of the second aspect, in a third possible implementation manner of the second aspect, the first radio access network controller is directly connected to the second radio access network controller by using an interface for a connection between access network nodes of the first radio access network standard; or the first radio access network controller is connected to the second radio access network controller by using an interface for a connection between an access network node and a core network node that are of the first radio access network standard.

With reference to the second possible implementation manner of the second aspect or the third possible implementation manner of the second aspect, in a fourth possible implementation manner of the second aspect, the third radio access network controller is connected to the second radio access network controller by using an interface for a connection between access network nodes of the second radio access network standard; or the third radio access network controller is connected to the second radio access network controller by using an interface for a connection between an access network node and a core network node that are of the second radio access network standard.

With reference to the second aspect and any possible implementation manner of the first to the fourth possible implementation manner of the second aspect, in a fifth possible implementation manner of the second aspect, the first radio access network information request information further carries type indication information for indicating a type of the target radio access network information.

With reference to the second aspect and any possible implementation manner of the first to the fifth possible implementation manner of the second aspect, in a sixth possible implementation manner of the second aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the second aspect and any possible implementation manner of the first to the sixth possible implementation manner of the second aspect, in a seventh possible implementation manner of the second aspect, the first radio access network information request information is carried in a common measurement request message, a resource status request message, a direct information transmission message, or a direct information transmission message of an evolved base station; or the second radio access network information request information is carried in a common measurement request message, a resource status request message, a direct information transmission message, or a direct information transmission message of an evolved base station.

With reference to the second aspect and any possible implementation manner of the first to the seventh possible implementation manner of the second aspect, in an eighth possible implementation manner of the second aspect, the target radio access network information is carried in a common measurement response message, a common measurement report message, a resource status response message, a resource status update message, or a direct transmission message of a mobility management entity.

According to a third aspect, a method for obtaining radio access network information is provided, including:

receiving, by a second radio access network controller, radio access network information request information from a first radio access network controller, where the radio access network information request information is used to request target radio access network information; the target radio access network information is radio access network information of the second radio access network controller; and the first radio access network controller and the second radio access network controller are access network nodes of different radio access network standards; and sending, by the second radio access network controller, the target radio access network information to the first radio access network controller.

In a first possible implementation manner of the third aspect, the radio access network information request information further carries sending mode indication information for indicating a mode for the second radio access network controller to send the target radio access network information to the first radio access network controller; and the sending, by the second radio access network controller, the target radio access network information to the first radio access network controller includes:

sending, by the second radio access network controller according to an instruction of the sending mode indication information, the target radio access network information to the first radio access network controller.

In a second possible implementation manner of the third aspect, the sending, by the second radio access network controller according to the instruction of the sending mode indication information, the target radio access network information to the first radio access network controller includes:

sending, by the second radio access network controller according to the instruction of the sending mode indication information, the target radio access network information to the first radio access network controller at any moment; or sending, by the second radio access network controller according to the instruction of the sending mode indication information, the target radio access network information to the first radio access network controller only once; or sending, by the second radio access network controller according to the instruction of the sending mode indication information, the target radio access network information to the first radio access network controller when a change occurs on the radio access network information of the second radio access network controller; or sending, by the second radio access network controller according to the instruction of the sending mode indication information, the target radio access network information to the first radio access network controller periodically.

With reference to the third aspect and any possible implementation manner of the first to the second possible implementation manner of the third aspect, in a third possible implementation manner of the third aspect, the radio access network information request information further carries type indication information for indicating a type of the target radio access network information.

With reference to the third aspect and any possible implementation manner of the first to the third possible implementation manner of the third aspect, in a fourth possible implementation manner of the third aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the third aspect and any possible implementation manner of the first to the fourth possible implementation manner of the third aspect, in a fifth possible implementation manner of the third aspect, the first radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

According to a fourth aspect, a method for obtaining radio access network information is provided, including:

sending, by a first radio access network controller, radio access network information request information to a second radio access network controller, where the radio access network information request information is used to request target radio access network information; the target radio access network information is radio access network information of the second radio access network controller; and the first radio access network controller and the second radio access network controller are access network nodes of different radio access network standards; and receiving, by the first radio access network controller, the target radio access network information from the second radio access network controller.

In a first possible implementation manner of the fourth aspect, the radio access network information request information further carries sending mode indication information for indicating a mode for the second radio access network controller to send the target radio access network information to the first radio access network controller; and the receiving, by the first radio access network controller, the target radio access network information from the second radio access network controller includes:

receiving, by the first radio access network controller, the target radio access network information that is from the second radio access network controller according to an instruction of the sending mode indication information.

With reference to the fourth aspect or the first possible implementation manner of the fourth aspect, in a second possible implementation manner of the fourth aspect, the radio access network information request information further carries type indication information for indicating a type of the target radio access network information.

With reference to the fourth aspect and any possible implementation manner of the first to the second possible implementation manner of the fourth aspect, in a third possible implementation manner of the fourth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the fourth aspect and any possible implementation manner of the first to the third possible implementation manner of the fourth aspect, in a fourth possible implementation manner of the fourth aspect, the first radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

According to a fifth aspect, a radio access network controller is provided, including:

a receiving module, configured to receive first radio access network information request information from a first radio access network controller, where the first radio access network information request information is used to request target radio access network information; the target radio access network information is radio access network information of a third radio access network controller; the first radio access network controller is an access network node of a first radio access network standard; and the third radio access network controller is an access network node of a second radio access network standard; and a sending module, configured to send the target radio access network information to the first radio access network controller.

In a first possible implementation manner of the fifth aspect, the sending module is further configured to send, before sending the target radio access network information, second radio access network information request information to the third radio access network controller; and the receiving module is further configured to receive, after the sending module sends the second radio access network information request information to the third radio access network controller, the target radio access network information from the third radio access network controller.

With reference to the fifth aspect or the first possible implementation manner of the fifth aspect, in a second possible implementation manner of the fifth aspect, the first radio access network information request information further carries sending mode indication information for indicating a mode for the radio access network controller to send the target radio access network information to the first radio access network controller; and the sending module is specifically configured to send, according to an instruction of the sending mode indication information received by the receiving module, the target radio access network information to the first radio access network controller.

With reference to the second possible implementation manner of the fifth aspect, in a third possible implementation manner of the fifth aspect, the sending module is specifically configured to send, according to the instruction of the sending mode indication information, the target radio access network information to the first radio access network controller at any moment; or the sending module is specifically configured to send, according to the instruction of the sending mode indication information, the target radio access network information to the first radio access network controller only once; or the sending module is specifically configured to send, according to the instruction of the sending mode indication information, the target radio access network information to the first radio access network controller when a change occurs on the radio access network information of the third radio access network controller; or the sending module is specifically configured to send, according to the instruction of the sending mode indication information, the target radio access network information to the first radio access network controller periodically.

With reference to the fifth aspect and any possible implementation manner of the first to the third possible implementation manner of the fifth aspect, in a fourth possible implementation manner of the fifth aspect, the radio access network controller is an access network node of the first radio access network standard; or the radio access network controller is an access network node of the second radio access network standard; or the radio access network controller is an intermediate node between the first radio access network controller and the third radio access network controller and the radio access network controller performs centralized control and management on radio resources of the first radio access network standard and the second radio access network standard.

With reference to the fourth possible implementation manner of the fifth aspect, in a fifth possible implementation manner of the fifth aspect, the first radio access network controller is directly connected to the radio access network controller by using an interface for a connection between access network nodes of the first radio access network standard; or the first radio access network controller is connected to the radio access network controller by using an interface for a connection between an access network node and a core network node that are of the first radio access network standard.

With reference to the fourth possible implementation manner of the fifth aspect or the fifth possible implementation manner of the fifth aspect, in a sixth possible implementation manner of the fifth aspect, the third radio access network controller is connected to the radio access network controller by using an interface for a connection between access network nodes of the second radio access network standard; or the third radio access network controller is connected to the radio access network controller by using an interface for a connection between an access network node and a core network node that are of the second radio access network standard.

With reference to the fifth aspect and any possible implementation manner of the first to the sixth possible implementation manner of the fifth aspect, in a seventh possible implementation manner of the fifth aspect, the first radio access network information request information further carries type indication information for indicating a type of the target radio access network information.

With reference to any possible implementation manner of the fifth aspect to the seventh possible implementation manner of the fifth aspect, in an eighth possible implementation manner of the fifth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the fifth aspect and any possible implementation manner of the first to the eighth possible implementation manner of the fifth aspect, in a ninth possible implementation manner of the fifth aspect, the first radio access network information request information is carried in a common measurement request message, a resource status request message, a direct information transmission message, or a direct information transmission message of an evolved base station; or the second radio access network information request information is carried in a common measurement request message, a resource status request message, a direct information transmission message, or a direct information transmission message of an evolved base station.

With reference to the fifth aspect and any possible implementation manner of the first to the ninth possible implementation manner of the fifth aspect, in a tenth possible implementation manner of the fifth aspect, the target radio access network information is carried in a common measurement response message, a common measurement report message, a resource status response message, a resource status update message, or a direct transmission message of a mobility management entity.

According to a sixth aspect, a radio access network controller is provided, including:

a sending module, configured to send first radio access network information request information to a second radio access network controller, where the first radio access network information request information is used to request target radio access network information; the target radio access network information is radio access network information of a third radio access network controller; the radio access network controller is an access network node of a first radio access network standard; and the third radio access network controller is an access network node of a second radio access network standard; and a receiving module, configured to receive, after the sending module sends the first radio access network information request information to the second radio access network controller, the target radio access network information from the second radio access network controller.

In a first possible implementation manner of the sixth aspect, the first radio access network information request information carries sending mode indication information for indicating a mode for the second radio access network controller to send the target radio access network information to the radio access network controller; and the receiving module is specifically configured to receive the target radio access network information that is from the second radio access network controller according to an instruction of the sending mode indication information.

With reference to the sixth aspect or the first possible implementation manner of the sixth aspect, in a second possible implementation manner of the sixth aspect, the second radio access network controller is an access network node of the first radio access network standard; or the second radio access network controller is an access network node of the second radio access network standard; or the second radio access network controller is an intermediate node between the radio access network controller and the third radio access network controller and the second radio access network controller performs centralized control and management on radio resources of the first radio access network standard and the second radio access network standard.

With reference to the second possible implementation manner of the sixth aspect, in a third possible implementation manner of the sixth aspect, the radio access network controller is directly connected to the second radio access network controller by using an interface for a connection between access network nodes of the first radio access network standard; or the radio access network controller is connected to the second radio access network controller by using an interface for a connection between an access network node and a core network node that are of the first radio access network standard.

With reference to the second possible implementation manner of the sixth aspect or the third possible implementation manner of the sixth aspect, in a fourth possible implementation manner of the sixth aspect, the third radio access network controller is connected to the second radio access network controller by using an interface for a connection between access network nodes of the second radio access network standard; or the third radio access network controller is connected to the second radio access network controller by using an interface for a connection between an access network node and a core network node that are of the second radio access network standard.

With reference to the sixth aspect and any possible implementation manner of the first to the fourth possible implementation manner of the sixth aspect, in a fifth possible implementation manner of the sixth aspect, the first radio access network information request information further carries type indication information for indicating a type of the target radio access network information.

With reference to the sixth aspect and any possible implementation manner of the first to the fifth possible implementation manner of the sixth aspect, in a sixth possible implementation manner of the sixth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the sixth aspect and any possible implementation manner of the first to the sixth possible implementation manner of the sixth aspect, in a seventh possible implementation manner of the sixth aspect, the first radio access network information request information is carried in a common measurement request message, a resource status request message, a direct information transmission message, or a direct information transmission message of an evolved base station; or the second radio access network information request information is carried in a common measurement request message, a resource status request message, a direct information transmission message, or a direct information transmission message of an evolved base station.

With reference to the sixth aspect and any possible implementation manner of the first to the seventh possible implementation manner of the sixth aspect, in an eighth possible implementation manner of the sixth aspect, the target radio access network information is carried in a common measurement response message, a common measurement report message, a resource status response message, a resource status update message, or a direct transmission message of a mobility management entity.

According to a seventh aspect, a radio access network controller is provided, including:

a receiving module, configured to receive radio access network information request information from a first radio access network controller, where the radio access network information request information is used to request target radio access network information; the target radio access network information is radio access network information of the radio access network controller; and the first radio access network controller and the radio access network controller are access network nodes of different radio access network standards; and a sending module, configured to send, after the receiving module receives the radio access network information request information from the first radio access network controller, the target radio access network information to the first radio access network controller.

In a first possible implementation manner of the seventh aspect, the radio access network information request information further carries sending mode indication information for indicating a mode for the radio access network controller to send the target radio access network information to the first radio access network controller; and the sending module is specifically configured to send, according to an instruction of the sending mode indication information, the target radio access network information to the first radio access network controller.

In a second possible implementation manner of the seventh aspect, the sending module is specifically configured to send, according to the instruction of the sending mode indication information, the target radio access network information to the first radio access network controller at any moment; or the sending module is specifically configured to send, according to the instruction of the sending mode indication information, the target radio access network information to the first radio access network controller only once; or the sending module is specifically configured to send, according to the instruction of the sending mode indication information, the target radio access network information to the first radio access network controller when a change occurs on the radio access network information of the second radio access network controller; or the sending module is specifically configured to send, according to the instruction of the sending mode indication information, the target radio access network information to the first radio access network controller periodically.

With reference to the seventh aspect and any possible implementation manner of the first to the second possible implementation manner of the seventh aspect, in a third possible implementation manner of the seventh aspect, the radio access network information request information further carries type indication information for indicating a type of the target radio access network information.

With reference to the seventh aspect and any possible implementation manner of the first to the third possible implementation manner of the seventh aspect, in a fourth possible implementation manner of the seventh aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the seventh aspect and any possible implementation manner of the first to the fourth possible implementation manner of the seventh aspect, in a fifth possible implementation manner of the seventh aspect, the radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

According to an eighth aspect, a radio access network controller is provided, including:

a sending module, configured to send radio access network information request information to a second radio access network controller, where the radio access network information request information is used to request target radio access network information; the target radio access network information is radio access network information of the second radio access network controller; and the radio access network controller and the second radio access network controller are access network nodes of different radio access network standards; and a receiving module, configured to receive, after the sending module sends the radio access network information request information to the second radio access network controller, the target radio access network information from the second radio access network controller.

In a first possible implementation manner of the eighth aspect, the radio access network information request information further carries sending mode indication information for indicating a mode for the second radio access network controller to send the target radio access network information to the radio access network controller; and the receiving module is further configured to receive the target radio access network information that is from the second radio access network controller according to an instruction of the sending mode indication information.

With reference to the eighth aspect or the first possible implementation manner of the eighth aspect, in a second possible implementation manner of the eighth aspect, the radio access network information request information further carries type indication information for indicating a type of the target radio access network information.

With reference to the eighth aspect and any possible implementation manner of the first to the second possible implementation manner of the eighth aspect, in a third possible implementation manner of the eighth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the eighth aspect and any possible implementation manner of the first to the third possible implementation manner of the eighth aspect, in a fourth possible implementation manner of the eighth aspect, the radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

According to a ninth aspect, a radio access network controller is provided, including:

a receiver, configured to receive first radio access network information request information from a first radio access network controller, where the first radio access network information request information is used to request target radio access network information; the target radio access network information is radio access network information of a third radio access network controller; the first radio access network controller is an access network node of a first radio access network standard; and the third radio access network controller is an access network node of a second radio access network standard; and a sender, configured to send the target radio access network information to the first radio access network controller.

In a first possible implementation manner of the ninth aspect, the sender is further configured to send, before sending the target radio access network information, second radio access network information request information to the third radio access network controller; and the receiver is further configured to receive, after the sender sends the second radio access network information request information to the third radio access network controller, the target radio access network information from the third radio access network controller.

With reference to the ninth aspect or the first possible implementation manner of the ninth aspect, in a second possible implementation manner of the ninth aspect, the first radio access network information request information further carries sending mode indication information for indicating a mode for the radio access network controller to send the target radio access network information to the first radio access network controller; and the sender is specifically configured to send, according to an instruction of the sending mode indication information received by the receiver, the target radio access network information to the first radio access network controller.

With reference to the second possible implementation manner of the ninth aspect, in a third possible implementation manner of the ninth aspect, the sender is specifically configured to send, according to the instruction of the sending mode indication information, the target radio access network information to the first radio access network controller at any moment; or the sender is specifically configured to send, according to the instruction of the sending mode indication information, the target radio access network information to the first radio access network controller only once; or the sender is specifically configured to send, according to the instruction of the sending mode indication information, the target radio access network information to the first radio access network controller when a change occurs on the radio access network information of the third radio access network controller; or the sender is specifically configured to send, according to the instruction of the sending mode indication information, the target radio access network information to the first radio access network controller periodically.

With reference to the ninth aspect and any possible implementation manner of the first to the third possible implementation manner of the ninth aspect, in a fourth possible implementation manner of the ninth aspect, the radio access network controller is an access network node of the first radio access network standard; or the radio access network controller is an access network node of the second radio access network standard; or the radio access network controller is an intermediate node between the first radio access network controller and the third radio access network controller and the radio access network controller performs centralized control and management on radio resources of the first radio access network standard and the second radio access network standard.

With reference to the fourth possible implementation manner of the ninth aspect, in a fifth possible implementation manner of the ninth aspect, the first radio access network controller is directly connected to the radio access network controller by using an interface for a connection between access network nodes of the first radio access network standard; or the first radio access network controller is connected to the radio access network controller by using an interface for a connection between an access network node and a core network node that are of the first radio access network standard.

With reference to the ninth aspect and any possible implementation manner of the first to the fifth possible implementation manner of the ninth aspect, in a sixth possible implementation manner of the ninth aspect, the third radio access network controller is connected to the radio access network controller by using an interface for a connection between access network nodes of the second radio access network standard; or the third radio access network controller is connected to the radio access network controller by using an interface for a connection between an access network node and a core network node that are of the second radio access network standard.

With reference to the ninth aspect and any possible implementation manner of the first to the sixth possible implementation manner of the ninth aspect, in a seventh possible implementation manner of the ninth aspect, the first radio access network information request information further carries type indication information for indicating a type of the target radio access network information.

With reference to the seventh possible implementation manner of the ninth aspect, in an eighth possible implementation manner of the ninth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the ninth aspect and any possible implementation manner of the first to the eighth possible implementation manner of the ninth aspect, in a ninth possible implementation manner of the ninth aspect, the first radio access network information request information is carried in a common measurement request message, a resource status request message, a direct information transmission message, or a direct information transmission message of an evolved base station; or the second radio access network information request information is carried in a common measurement request message, a resource status request message, a direct information transmission message, or a direct information transmission message of an evolved base station.

With reference to the ninth aspect and any possible implementation manner of the first to the ninth possible implementation manner of the ninth aspect, in a tenth possible implementation manner of the ninth aspect, the target radio access network information is carried in a common measurement response message, a common measurement report message, a resource status response message, a resource status update message, or a direct transmission message of a mobility management entity.

According to a tenth aspect, a radio access network controller is provided, including:

a sender, configured to send first radio access network information request information to a second radio access network controller, where the first radio access network information request information is used to request target radio access network information; the target radio access network information is radio access network information of a third radio access network controller; the radio access network controller is an access network node of a first radio access network standard; and the third radio access network controller is an access network node of a second radio access network standard; and a receiver, configured to receive, after the sender sends the first radio access network information request information to the second radio access network controller, the target radio access network information from the second radio access network controller.

In a first possible implementation manner of the tenth aspect, the first radio access network information request information carries sending mode indication information for indicating a mode for the second radio access network controller to send the target radio access network information to the radio access network controller; and the receiver is specifically configured to receive the target radio access network information that is from the second radio access network controller according to an instruction of the sending mode indication information.

With reference to the tenth aspect or the first possible implementation manner of the tenth aspect, in a second possible implementation manner of the tenth aspect, the second radio access network controller is an access network node of the first radio access network standard; or the second radio access network controller is an access network node of the second radio access network standard; or the second radio access network controller is an intermediate node between the radio access network controller and the third radio access network controller and the second radio access network controller performs centralized control and management on radio resources of the first radio access network standard and the second radio access network standard.

With reference to the second possible implementation manner of the tenth aspect, in a third possible implementation manner of the tenth aspect, the radio access network controller is directly connected to the second radio access network controller by using an interface for a connection between access network nodes of the first radio access network standard; or the radio access network controller is connected to the second radio access network controller by using an interface for a connection between an access network node and a core network node that are of the first radio access network standard.

With reference to the second possible implementation manner of the tenth aspect or the third possible implementation manner of the tenth aspect, in a fourth possible implementation manner of the tenth aspect, the third radio access network controller is connected to the second radio access network controller by using an interface for a connection between access network nodes of the second radio access network standard; or the third radio access network controller is connected to the second radio access network controller by using an interface for a connection between an access network node and a core network node that are of the second radio access network standard.

With reference to the tenth aspect and any possible implementation manner of the first to the fourth possible implementation manner of the tenth aspect, in a fifth possible implementation manner of the tenth aspect, the first radio access network information request information further carries type indication information for indicating a type of the target radio access network information.

With reference to the tenth aspect and any possible implementation manner of the first to the fifth possible implementation manner of the tenth aspect, in a sixth possible implementation manner of the tenth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the tenth aspect and any possible implementation manner of the first to the sixth possible implementation manner of the tenth aspect, in a seventh possible implementation manner of the tenth aspect, the first radio access network information request information is carried in a common measurement request message, a resource status request message, a direct information transmission message, or a direct information transmission message of an evolved base station; or the second radio access network information request information is carried in a common measurement request message, a resource status request message, a direct information transmission message, or a direct information transmission message of an evolved base station.

With reference to the tenth aspect and any possible implementation manner of the first to the seventh possible implementation manner of the tenth aspect, in an eighth possible implementation manner of the tenth aspect, the target radio access network information is carried in a common measurement response message, a common measurement report message, a resource status response message, a resource status update message, or a direct transmission message of a mobility management entity.

According to an eleventh aspect, a radio access network controller is provided, including:

a receiver, configured to receive radio access network information request information from a first radio access network controller, where the radio access network information request information is used to request target radio access network information; the target radio access network information is radio access network information of the radio access network controller; and the first radio access network controller and the radio access network controller are access network nodes of different radio access network standards; and a sender, configured to send, after the receiver receives the radio access network information request information from the first radio access network controller, the target radio access network information to the first radio access network controller.

In a first possible implementation manner of the eleventh aspect, the radio access network information request information further carries sending mode indication information for indicating a mode for the radio access network controller to send the target radio access network information to the first radio access network controller; and the sender is specifically configured to send, according to an instruction of the sending mode indication information, the target radio access network information to the first radio access network controller.

In a second possible implementation manner of the eleventh aspect, the sender is specifically configured to send, according to the instruction of the sending mode indication information, the target radio access network information to the first radio access network controller at any moment; or the sender is specifically configured to send, according to the instruction of the sending mode indication information, the target radio access network information to the first radio access network controller only once; or the sender is specifically configured to send, according to the instruction of the sending mode indication information, the target radio access network information to the first radio access network controller when a change occurs on the radio access network information of the second radio access network controller; or the sender is specifically configured to send, according to the instruction of the sending mode indication information, the target radio access network information to the first radio access network controller periodically.

With reference to the eleventh aspect and any possible implementation manner of the first to the second possible implementation manner of the eleventh aspect, in a third possible implementation manner of the eleventh aspect, the radio access network information request information further carries type indication information for indicating a type of the target radio access network information.

With reference to the eleventh aspect and any possible implementation manner of the first to the third possible implementation manner of the eleventh aspect, in a fourth possible implementation manner of the eleventh aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the eleventh aspect and any possible implementation manner of the first to the fourth possible implementation manner of the eleventh aspect, in a fifth possible implementation manner of the eleventh aspect, the first radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

According to a twelfth aspect, a radio access network controller is provided, including:

a sender, configured to send radio access network information request information to a second radio access network controller, where the radio access network information request information is used to request target radio access network information; the target radio access network information is radio access network information of the second radio access network controller; and the radio access network controller and the second radio access network controller are access network nodes of different radio access network standards; and a receiver, configured to receive, after the sender sends the radio access network information request information to the second radio access network controller, the target radio access network information from the second radio access network controller.

In a first possible implementation manner of the twelfth aspect, the radio access network information request information further carries sending mode indication information for indicating a mode for the second radio access network controller to send the target radio access network information to the radio access network controller; and the receiver is further configured to receive the target radio access network information that is from the second radio access network controller according to an instruction of the sending mode indication information.

With reference to the twelfth aspect or the first possible implementation manner of the twelfth aspect, in a second possible implementation manner of the twelfth aspect, the radio access network information request information further carries type indication information for indicating a type of the target radio access network information.

With reference to the twelfth aspect and any possible implementation manner of the first to the second possible implementation manner of the twelfth aspect, in a third possible implementation manner of the twelfth aspect, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

With reference to the twelfth aspect and any possible implementation manner of the first to the third possible implementation manner of the twelfth aspect, in a fourth possible implementation manner of the twelfth aspect, the radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

According to the method for obtaining radio access network information and the radio access network controller according to the embodiments, first, a second radio access network controller receives first radio access network information request information from a first radio access network controller; and then, determines whether target radio access network information exists locally according to the first radio access network information request information; and if determining that the target radio access network information exists locally, the second radio access network controller sends the target radio access network information to the first radio access network controller without involving a first core network entity and a second core network entity. Therefore, this reduces, to a certain extent, a case where a source core network entity and a target core network entity repeatedly transmit the same radio access network information multiple times, thereby reducing resource waste, improving a resource utilization rate and reducing a burden on the source core network entity and the target core network entity.

DESCRIPTION OF EMBODIMENTS

Figure 1:
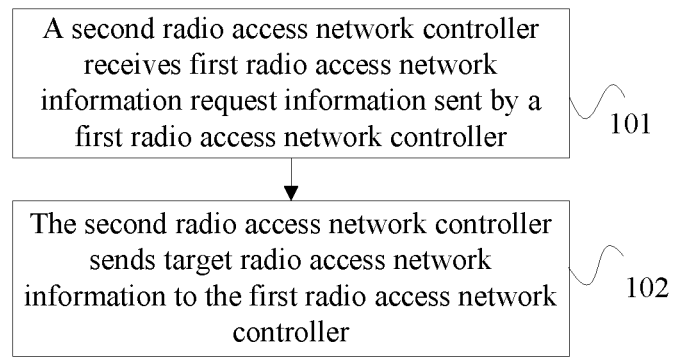
FIG. 1 is a schematic flowchart of a method for obtaining radio access network information according to an embodiment of the present invention.

FIG. 1 is a schematic flowchart of a method for obtaining radio access network information according to an embodiment of the present invention. As shown in FIG. 1, a method for obtaining radio access network information specifically includes the following steps:

S101: A second radio access network controller receives first radio access network information request information from a first radio access network controller, where the first radio access network information request information is used to request target radio access network information; the target radio access network information is radio access network information of a third radio access network controller; the first radio access network controller is an access network node of a first radio access network standard and the third radio access network controller is an access network node of a second radio access network standard.

In this embodiment, the second radio access network controller may be an access network node of the first radio access network standard; or the second radio access network controller may be an access network node of the second radio access network standard; or the second radio access network controller is an intermediate node between the first radio access network controller and the third radio access network controller and the second radio access network controller performs centralized control and management on radio resources of the first radio access network standard and the second radio access network standard.

Specifically, when the second radio access network controller is the access network node of the first radio access network standard, the access network node of the first radio access network standard may include one second radio access network controller and at least one first radio access network controller. The second radio access network controller is related to the first radio access network controller in at least two cases. In one case, the second radio access network controller covers the first radio access network controller. For example, the second radio access network controller may be a macro base station and the first radio access network controller is one micro base station in at least one micro base station within a coverage range of the macro base station. It should be noted that a macro base station can provide a large coverage range; however, a coverage hole or some hotspot areas may exist in the coverage range of the macro base station, resulting in a case where access of a user equipment fails. Therefore, a micro base station may be set up in these areas to fill the coverage hole of or expand capacity for the macro base station. In another case, the second radio access network controller is equivalent to the first radio access network controller. That is, the second radio access network controller has a coverage range independent of that of each first radio access network controller. For example, in a first case, the second radio access network controller is an LTE macro base station and the first radio access network controller is an LTE micro base station, or the second radio access network controller is a UMTS macro base station and the first radio access network controller is a UMTS micro base station; in a second case, the second radio access network controller and the first radio access network controller both may be an LTE macro cell base station eNB, or the second radio access network controller and the first radio access network controller both may be an LTE micro cell base station, or the second radio access network controller and the first radio access network controller both may be a UMTS macro base station RNC, or the second radio access network controller and the first radio access network controller both may be a UMTS micro base station RNC.

When the second radio access network controller is the access network node of the second radio access network standard, the second radio access network controller is related to the third radio access network controller in at least two cases. In one case, the second radio access network controller covers the third radio access network controller. For example, the second radio access network controller may be a macro base station and the third radio access network controller is one micro base station in at least one micro base station within a coverage range of the macro base station. In another case, the second radio access network controller is equivalent to the third radio access network controller. That is, the second radio access network controller has a coverage range independent of that of each third radio access network controller. For example, in a first case, the second radio access network controller is an LTE macro base station and the third radio access network controller is an LTE micro base station, or the second radio access network controller is a UMTS macro base station and the third radio access network controller is a UMTS micro base station; in a second case, the second radio access network controller and the third radio access network controller both may be an LTE macro cell base station eNB, or the second radio access network controller and the third radio access network controller both may be an LTE micro cell base station, or the second radio access network controller and the third radio access network controller both may be a UMTS macro base station RNC, or the second radio access network controller and the third radio access network controller both may be a UMTS micro base station RNC.

When the second radio access network controller is an intermediate node between the first radio access network controller and the third radio access network controller, the second radio access network controller performs centralized control and management on radio resources of the first radio access network standard and the second radio access network standard. A connection relationship between the first radio access network controller and the second radio access network controller may have two application scenarios. In a first application scenario, the first radio access network controller may be directly connected to the second radio access network controller by using an interface for a connection between access network nodes of the first radio access network standard. For example, when the first radio access network standard is LTE, a radio access network controller eNB of the first radio access network standard may perform signaling communication and/or data transmission with the second radio access network controller by using an X2 interface; when the first radio access network standard is UMTS, a radio access network controller RNC of the first radio access network standard may perform signaling communication and/or data transmission with the second radio access network controller by using an Iur interface. Alternatively, in a second application scenario, the first radio access network controller may be connected to the second radio access network controller by using an interface for a connection between an access network node and a core network node that are of the first radio access network standard. For example, when the first radio access network standard is LTE, a radio access network controller eNB of the first radio access network standard may perform signaling communication and/or data transmission with the second radio access network controller by using an S1 interface; when the first radio access network standard is UMTS, a radio access network controller RNC of the first radio access network standard may perform signaling communication and/or data transmission with the second radio access network controller by using an Iu interface. Correspondingly, a connection relationship between the third radio access network controller and the second radio access network controller may have two application scenarios. In a first application scenario, the third radio access network controller is connected to the second radio access network controller by using an interface for a connection between access network nodes of the second radio access network standard. For example, when the second radio access network standard is LTE, a radio access network controller eNB of the second radio access network standard may perform signaling communication and/or data transmission with the second radio access network controller by using an X2 interface; when the second radio access network standard is UMTS, a radio access network controller RNC of the second radio access network standard may perform signaling communication and/or data transmission with the second radio access network controller by using an Iur interface. Alternatively, in a second application scenario, the third radio access network controller is connected to the second radio access network controller by using an interface for a connection between an access network node and a core network node that are of the second radio access network standard. For example, when a second radio access network standard is LTE, a radio access network controller eNB of the second radio access network standard may perform signaling communication and/or data transmission with the second radio access network controller by using an S1 interface; when the second radio access network standard is UMTS, a radio access network controller RNC of the second radio access network standard may perform signaling communication and/or data transmission with the second radio access network controller by using an Iu interface.

It should be noted that when the second radio access network controller is an intermediate node between the first radio access network controller and the third radio access network controller and the second radio access network controller performs centralized control and management on radio resources of the first radio access network standard and the second radio access network standard, if the first radio access network standard is Long Term Evolution (LTE), an interface for a connection between access network nodes of the first radio access network standard may be X2 and an interface for a connection between an access network node and a core network node that are of the first radio access network standard may be S1; if the second radio access network standard is a Universal Mobile Telecommunications System (UMTS), an interface for a connection between access network nodes of the second radio access network standard may be Iur and an interface for a connection between an access network node and a core network node that are of the second radio access network standard may be Iu. Specific standards of the first radio access network standard and the second radio access network standard are not limited.

In this embodiment, no matter the second radio access network controller is an access network node of which radio access network standard, or in a case where the second radio access network controller is an intermediate node between the first radio access network controller and the third radio access network controller, when at least one first radio access network controller requests the same target radio access network information from the third radio access network controller, the second radio access network controller only needs to send a request to the third radio access network controller once to obtain the target radio access network information and then may provide the target radio access network information to the at least one first radio access network controller.

In this embodiment, when the first radio access network controller of the first radio access network standard needs to request the radio access network information of the third radio access network controller of the second radio access network standard, the first radio access network controller of the first radio access network standard may send the radio access network information request information to the second radio access network controller, so that the second radio access network controller provides the radio access network information of the third radio access network controller according to the radio access network information request information. For example, when the second radio access network standard is UMTS, the third radio access network controller may be a radio network controller (RNC); the first radio access network standard is Long Term Evolution (LTE); and the first radio access network controller may be an evolved base station (eNB). If the second radio access network controller belongs to the same radio access network standard as the first radio access network controller, the second radio access network controller is a macro eNB. Optionally, the first radio access network controller is a micro eNB within a coverage range of the macro eNB. When the micro eNB needs to request radio access network information of the RNC, the micro eNB sends first radio access network information request information to the macro eNB first.

Specifically, the second radio access network controller receives the radio access network information request information from the first radio access network controller, where the radio access network information request information is referred to as first radio access network information request information to facilitate differentiation. The first radio access network information request information is used to request target radio access network information, where the target radio access network information may be radio access network information of the third radio access network controller.

No matter the second radio access network controller is an access network node of which radio access network standard, in this embodiment, the first radio access network information request information may be sent in two implementation manners. In a first manner, the first radio access network controller sends the first radio access network information request information to the second radio access network controller directly through a port between the first radio access network controller and the second radio access network controller and the second radio access network controller directly receives, through the port between the second radio access network controller and the first radio access network controller, the first radio access network information request information from the first radio access network controller. In a second manner, the first radio access network controller sends the first radio access network information request information to the second radio access network controller by using a core network node of the first radio access network standard, that is, a first core network entity and a core network node of the second radio access network standard, that is, a second core network entity; and the second radio access network controller receives, by using the first core network entity and the second core network entity, the first radio access network information request information from the first radio access network controller.

For example, when the second radio access network standard is a Universal Mobile Telecommunications System (UMTS), the second core network entity may be a serving GPRS support node (SGSN); and when the first radio access network standard is the LTE system, the first core network entity may be a mobility management entity (MME). The foregoing exemplary description is provided by using an example where the first core network entity is an MME and accordingly the second core network entity may be an SGSN; however, no limitation is set herein. For example, another application scenario is that the first core network entity and the second core network entity both are an SGSN and the first radio access network controller and the third radio access network controller may be different RNCs. Another application scenario is that the first core network entity and the second core network entity may both be MMEs and the first radio access network controller and the third radio access network controller may be different macro base stations or micro base stations.

S102: The second radio access network controller sends the target radio access network information to the first radio access network controller.

In this embodiment, after receiving the first radio access network information request information from the first radio access network controller, the second radio access network controller determines whether the target radio access network information exists locally. If the target radio access network information exists locally on the second radio access network controller, the second radio access network controller sends the target radio access network information to the first radio access network controller. If the target radio access network information does not exist locally on the second radio access network controller, the second radio access network controller sends second radio access network information request information to the third radio access network controller; and the second radio access network controller receives radio access network information from the third radio access network controller and then sends the target radio access network information to the first radio access network controller, where the second radio access network information request information may carry the same content as the first radio access network information request information, or the second radio access network information request information may carry content that is partially the same as content carried in the first radio access network information request information.

In this embodiment, a case where the target radio access network information exists locally on the second radio access network controller may be that, before receiving the first radio access network information request information, the second radio access network controller obtains, according to radio access network information request information from another radio access network controller, the target radio access network information by using a core network node of the second radio access network standard or by using a core network node of the first radio access network standard and a core network node of the second radio access network standard and then stores the target radio access network information locally, where the core network node is a core network entity; or before receiving the first radio access network information request information, the second radio access network controller obtains, according to radio access network information request information from another radio access network controller, the target radio access network information through the port between the second radio access network controller and the third radio access network controller and then stores the target radio access network information locally; or before receiving the first radio access network information request information, the second radio access network controller proactively obtains the target radio access network information by using a core network node of the second radio access network standard or by using a core network node of the first radio access network standard and a core network node of the second radio access network standard and then stores the target radio access network information locally; or before receiving the first radio access network information request information, the second radio access network controller proactively obtains the target radio access network information through a port between the second radio access network controller and the third radio access network controller and then stores the target radio access network information locally.

The sending, by the second radio access network controller, the target radio access network information to the first radio access network controller may include: sending, by the second radio access network controller, the target radio access network information to the first radio access network controller in a unicast manner. Alternatively, the second radio access network controller may also send the target radio access network information to the first radio access network controller in a broadcast manner.

According to the foregoing embodiment, in the method for obtaining radio access network information according to this embodiment, the second radio access network controller receives the first radio access network information request information from the first radio access network controller and determines, according to the first radio access network information request information, whether the target radio access network information exists locally; and if a determining result indicates that the target radio access network information exists locally, the second radio access network controller sends the target radio access network information to the first radio access network controller without involving the first core network entity and the second core network entity. Therefore, this reduces, to a certain extent, a case where the core network entities transmit the radio access network information multiple times, thereby reducing resource waste, improving a resource utilization rate and reducing a burden on the source core network entity and the target core network entity.

Furthermore, if the second radio access network controller determines that the target radio access network information does not exist locally, the second radio access network controller sends the second radio access network information request information to the third radio access network controller; the second radio access network controller receives the target radio access network information sent, according to the second radio access network information request information, by the third radio access network controller; and then the second radio access network controller sends the target radio access network information to the first radio access network controller and stores the target radio access network information. The second radio access network controller may send the second radio access network information request information to the third radio access network controller by using a core network entity. For example, if the second radio access network controller is an access network node of the first radio access network standard, the second radio access network controller may send the second radio access network information request information to the third radio access network controller by using the first core network entity and the second core network entity; and if the second radio access network controller is an access network node of the second radio access network standard, the second radio access network controller may send the second radio access network information request information to the third radio access network controller by using the second core network entity. In addition, the second radio access network controller may also send the second radio access network information request information to the third radio access network controller directly through the port between the second radio access network controller and the third radio access network controller.

If the second radio access network controller stores the information locally, when the first radio access network controller or another access network node of the first radio access network standard requests the target radio access network information again, the second radio access network controller may directly obtain the target radio access network information locally without requesting the target radio access network information from the third radio access network controller again. This reduces the number of times of requesting the target radio access network information from the third radio access network controller, particularly in a case where the target radio access network information is requested from the third radio access network controller by using the core network entity, reduces, to a certain extent, a case where the core network entity repeatedly transmits the same radio access network information, thereby reducing resource waste, improving a resource utilization rate and reducing a burden on the source core network entity and the target core network entity. Optionally, the second radio access network controller may also not store the target radio access network information.

In an optional implementation manner, besides representing a request for the target radio access network information, the first radio access network information request information from the first radio access network controller to the second radio access network controller may further carry sending mode indication information, where the sending mode indication information is used to indicate a mode for the second radio access network controller to send the target radio access network information to the first radio access network controller. On such a basis, an implementation manner of S102 includes: sending, by the second radio access network controller according to a sending mode indicated by the sending mode indication information, the target radio access network information to the first radio access network controller, where the sending mode indication may include an indication of sending randomly, an indication of sending once, an indication of sending multiple times and an indication of sending periodically.

For example, a sending mode indicated by the mode indication of sending randomly may be sending at any moment; and accordingly the second radio access network controller sends the target radio access network information to the first radio access network controller at any moment;

or, a sending mode indicated by the mode indication of sending periodically may be sending periodically; and accordingly the second radio access network controller may send the target radio access network information to the first radio access network controller periodically;

or, the mode indication of sending once specifically indicates sending time for the second radio access network controller to send the target radio access network information to the first radio access network controller once; and accordingly the second radio access network controller may send the target radio access network information to the first radio access network controller at the sending time indicated by the sending mode indication;

or, the mode indication of sending multiple times may instruct the second radio access network controller to send, when a change occurs on the target radio access network information, the target radio access network information to the first radio access network controller; and accordingly the second radio access network controller sends, according to the instruction of the sending mode indication, changed target radio access network information to the first radio access network controller when a change occurs on the target radio access network information.

Furthermore, the first radio access network information request information from the first radio access network controller and received by the second radio access network controller carries the sending mode indication information, where the sending mode indication information may be used to indicate a mode for the second radio access network controller to send the target radio access network information to the first radio access network controller; and accordingly, before sending the target radio access network information to the first radio access network controller, the second radio access network controller needs to receive the sending mode indication information from the first radio access network controller first and then sends the target radio access network information to the first radio access network controller according to the sending mode indication information.

In the foregoing embodiment, the first radio access network information request information may further carry type indication information for indicating a type of the target radio access network information.

Specifically, the target radio access network information includes one or any combination of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

It should be noted that the first radio access network information request information may include an identifier of a target node to be requested or target cell identifier, where the target cell identifier may include a specific target node identifier and a type of radio access network information to be requested. The second radio access network controller may determine, according to the target node identifier or target cell identifier and the radio access network information type, whether the requested radio access network information exists locally.

In an implementation method of this embodiment, the first radio access network information request information may be specifically carried in a common measurement request message, a resource status request message, a direct information transmission message, or a direct information transmission message of an evolved base station.

The second radio access network information request information may be carried in a common measurement request message, a resource status request message, a direct information transmission message, or a direct information transmission message of an evolved base station.

The target radio access network information may be carried in a common measurement response message, a common measurement report message, a resource status response message, a resource status update message, or a direct transmission message of a mobility management entity.

It should be noted that in this embodiment, the first radio access network information request information, the second radio access network information request information and the target radio access network information may be carried in the foregoing messages, which is not limited to the foregoing messages and may also be carried in other messages.

The radio access network standard may be GSM, UMTS, time division-synchronous code division multiple access (TD-SCDMA), wideband code division multiple access (WCDMA), wireless local area network (WLAN), LTE, or the like. A corresponding radio access network controller may be a base station controller (BSC), a radio network controller (RNC), an access controller (AC), or an evolved base station (eNB).

It should be noted that a format in which the first radio access network information request information or the target radio access network information is sent may be a format of a base station subsystem general packet radio service protocol radio access network information management protocol data unit (BSSGP RIM PDU) defined in the 3GPP specification 48.018. Specifically, a destination cell identifier in a radio access network information request protocol data unit (RAN-INFORMATION-REQUEST PDU) is an identifier of an RNC and a requested cell in a radio access network information management container (RIM Container) is a cell under an RNC.

Figure 2:
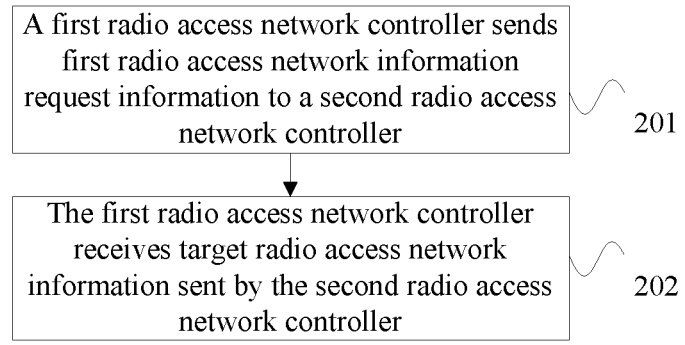
FIG. 2 is a schematic flowchart of a method for obtaining radio access network information according to another embodiment of the present invention.

FIG. 2 is a schematic flowchart of a method for obtaining radio access network information according to another embodiment of the present invention. As shown in FIG. 2, the method for obtaining radio access network information includes the following steps:

S201: A first radio access network controller sends first radio access network information request information to a second radio access network controller, where the first radio access network information request information is used to request target radio access network information; the target radio access network information is radio access network information of a third radio access network controller; the first radio access network controller is an access network node of a first radio access network standard; and the third radio access network controller is an access network node of a second radio access network standard.

In this embodiment, the second radio access network controller may be an access network node of the first radio access network standard; or the second radio access network controller may be an access network node of the second radio access network standard; or the second radio access network controller is an intermediate node between the first radio access network controller and the third radio access network controller and does not belong to the first radio access network standard or the second radio access network standard and the second radio access network controller may coordinate exchange of radio resource information of a same standard or different standards.

Specifically, when the second radio access network controller is the access network node of the first radio access network standard, the access network node of the first radio access network standard may include one second radio access network controller and at least one first radio access network controller. The second radio access network controller is related to the first radio access network controller in at least two cases. In one case, the second radio access network controller covers the first radio access network controller. For example, the second radio access network controller may be a macro base station and the first radio access network controller is one micro base station in at least one micro base station within a coverage range of the macro base station. In another case, the second radio access network controller is equivalent to the first radio access network controller. For example, the second radio access network controller has a coverage range independent of that of each first radio access network controller.

When the second radio access network controller is the access network node of the second radio access network standard, the second radio access network controller is related to the third radio access network controller in at least two cases. In one case, the second radio access network controller covers the third radio access network controller. For example, the second radio access network controller may be a macro base station and the third radio access network controller is one micro base station in at least one micro base station within a coverage range of the macro base station. In another case, the second radio access network controller is equivalent to the third radio access network controller. For example, the second radio access network controller has a coverage range independent of that of each third radio access network controller.

When the second radio access network controller is an intermediate node between the first radio access network controller and the third radio access network controller and does not belong to the first radio access network standard or the second radio access network standard, a connection relationship between the first radio access network controller and the second radio access network controller may have two application scenarios. In a first application scenario, the first radio access network controller may be directly connected to the second radio access network controller by using an interface for a connection between access network nodes of the first radio access network standard; alternatively, in a second application scenario, the first radio access network controller may be connected to the second radio access network controller by using an interface for a connection between an access network node and a core network node that are of the first radio access network standard. Correspondingly, a connection relationship between the third radio access network controller and the second radio access network controller may have two application scenarios. In a first application scenario, the third radio access network controller is connected to the second radio access network controller by using an interface for a connection between access network nodes of the second radio access network standard; alternatively, in a second application scenario, the third radio access network controller is connected to the second radio access network controller by using an interface for a connection between an access network node and a core network node that are of the second radio access network standard.

No matter the second radio access network controller is an access network node of which radio access network standard, the second radio access network controller sends a request to the third radio access network controller once and may obtain target radio access network information requested by at least one first radio access network controller.

For example, when the second radio access network standard is UMTS, the third radio access network controller may be an RNC; the first radio access network standard is LTE; and the first radio access network controller and the second radio access network controller may be eNBs, where the second radio access network controller is a macro eNB and the first radio access network controller is a micro eNB within a coverage range of the macro eNB. When the micro eNB needs to request radio access network information of the RNC, the micro eNB sends first radio access network information request information to the macro eNB first.

No matter how the second radio access network controller is related to the first radio access network controller, in this embodiment, the radio access network controllers are configured to allow multiple first radio access network controllers to send radio access network information request information to the second radio access network controller to request target radio access network information.

Specifically, the second radio access network controller is the access network node of the second radio access network standard, the access network node of the second radio access network standard may include one second radio access network controller and at least one third radio access network controller. The second radio access network controller is related to the third radio access network controller in at least two cases. In one case, the second radio access network controller is a macro base station of an access network node of the second radio access network standard and the third radio access network controller is one micro base station in at least one micro base station within a coverage range of the macro base station. In another case, the second radio access network controller of the second radio access network standard is configured to allow the second radio access network controller to be connected to at least one third radio access network controller.

No matter how the second radio access network controller is related to the first radio access network controller, when the first radio access network controller needs to request radio access network information of the third radio access network controller, the first radio access network controller sends radio access network information request information to the second radio access network controller, so as to request the target radio access network information, where the target radio access network information may be radio access network information of the at least one third radio access network controller connected to the second radio access network controller.

No matter how the second radio access network controller is related to the third radio access network controller, in this embodiment, the first radio access network information request information may be sent in two implementation manners. In a first manner, the second radio access network controller receives, through a port between the first radio access network controller and the second radio access network controller, first radio access network information request information from the first radio access network controller, where first radio access network information request information is used to request the radio access network information of the third radio access network controller. In a second manner, the second radio access network controller receives, by using a first core network entity of a core network node of the first radio access network standard and a second core network entity of a core network node of the second radio access network standard, first radio access network information request information from the first radio access network controller, where first radio access network information request information is used to request the radio access network information of the third radio access network controller.

For example, the second radio access network standard is UMTS; the second core network entity may be an SGSN; the first radio access network standard is an LTE system; and the first core network entity may be an MME. The foregoing exemplary description is provided by using an example where the first core network entity is an MME and accordingly the second core network entity may be an SGSN; however, no limitation is set herein. For example, another application scenario is that the first core network entity is an SGSN; the first radio access network controller and the second radio access network controller may be different RNCs; and the second core network entity may be an MME. Correspondingly, the third radio access network controller may be a macro base station or a micro base station.

Specifically, the first radio access network controller sends the radio access network information request information to the second radio access network controller, where the radio access network information request information is referred to as first radio access network information request information to facilitate differentiation. The first radio access network information request information is used to request target radio access network information, where the target radio access network information may be radio access network information of the third radio access network controller.

S202: The first radio access network controller receives the target radio access network information from the second radio access network controller.

In this embodiment, after sending the first radio access network information request information to the second radio access network controller, the first radio access network controller receives the target radio access network information from the second radio access network controller. The second radio access network controller may send the target radio access network information to the first radio access network controller according to the first radio access network information request information. Optionally, the second radio access network controller may also send the target radio access network information to the first radio access network controller in a broadcast manner. On such a basis, besides the first radio access network controller, another first radio access network controller connected to the second radio access network controller may also receive the target radio access network information.

After receiving the first radio access network information request information, the second radio access network controller determines, according to the first radio access network information request information, whether the radio access network information of the third radio access network controller, that is, the target radio access network information, exists locally. If determining that the target radio access network information exists locally, the second radio access network controller sends the locally stored target radio access network information to the first radio access network controller. If determining that the target radio access network information does not exist, the second radio access network controller obtains the target radio access network information through a port between the second radio access network controller and the third radio access network controller and then provides the target radio access network information for the first radio access network controller.

According to the foregoing embodiment, in the method for obtaining radio access network information according to this embodiment, the first radio access network controller sends the first radio access network information request information to the second radio access network controller; and then, the first radio access network controller receives the target radio access network information from the second radio access network controller, instead of obtaining the target radio access network information directly by using the first core network entity and the second core network entity as in the prior art. Moreover, in a case where the target radio access network information exists locally on the second radio access network controller, the target radio access network information may be obtained without involving the first core network entity and the second core network entity, which reduces, to a certain extent, a case where the core network entities transmit the radio access network information multiple times, thereby reducing resource waste, improving a resource utilization rate and reducing a burden on a source core network entity and a target core network entity.

In an optional implementation manner, the first radio access network information request information from the first radio access network controller to the second radio access network controller may indicate that the first radio access network controller is going to request the target radio access network information soon, so as to tell the second radio access network controller to get ready in a timely manner. In this way, when the first radio access network controller requests obtaining of the target radio access network information, the second radio access network controller can provide the target radio access network information in a timely manner. On such a basis, an implementation manner of S202 includes: sending, by the first radio access network controller, sending mode indication information to the second radio access network controller, where the sending mode indication information is used to indicate a mode for the second radio access network controller to send the target radio access network information to the first radio access network controller; and receiving, by the first radio access network controller, the target radio access network information that is from the second radio access network controller according to an instruction of the sending mode indication information. This implementation manner helps to ensure the timeliness for the first radio access network controller to obtain the target radio access network information.

In an optional implementation manner, besides representing a request for the target radio access network information, the first radio access network information request information from the first radio access network controller to the second radio access network controller may further carry sending mode indication information for indicating a mode for the second radio access network controller to send the target radio access network information to the first radio access network controller. On such a basis, an implementation manner of S202 includes: receiving, by the first radio access network controller, the target radio access network information that is from the second radio access network controller according to a sending mode indicated by the sending mode indication information, where the sending mode indication may include an indication of sending randomly, an indication of sending once, an indication of sending multiple times and an indication of sending periodically.

For example, a sending mode indicated by the mode indication of sending randomly may be sending at any moment; and accordingly the second radio access network controller sends the target radio access network information to the first radio access network controller at any moment;

or, a sending mode indicated by the mode indication of sending periodically may be sending periodically; and accordingly the second radio access network controller may send the target radio access network information to the first radio access network controller periodically;

or, the mode indication of sending once specifically indicates sending time for the second radio access network controller to send the target radio access network information to the first radio access network controller once; and accordingly the second radio access network controller may send the target radio access network information to the first radio access network controller at the sending time indicated by the sending mode indication;

or, the mode indication of sending multiple times may instruct the second radio access network controller to send, when a change occurs on the target radio access network information, the target radio access network information to the first radio access network controller; and accordingly the second radio access network controller sends, according to the instruction of the sending mode indication, changed target radio access network information to the first radio access network controller when a change occurs on the target radio access network information.

It should be noted that the first radio access network information request information may be carried in a common measurement request message, a resource status request message, a direct information transmission message, or a direct information transmission message of an evolved base station; or the second radio access network information request information may be carried in a common measurement request message, a resource status request message, a direct information transmission message, or a direct information transmission message of an evolved base station.

The target radio access network information is carried in a common measurement response message, a common measurement report message, a resource status response message, a resource status update message, or a direct transmission message of a mobility management entity.

It should be noted that in this embodiment, the first radio access network information request information, the second radio access network information request information and the target radio access network information may be carried in the foregoing messages, which is not limited to the foregoing messages and may also be carried in other messages.

Figure 3:
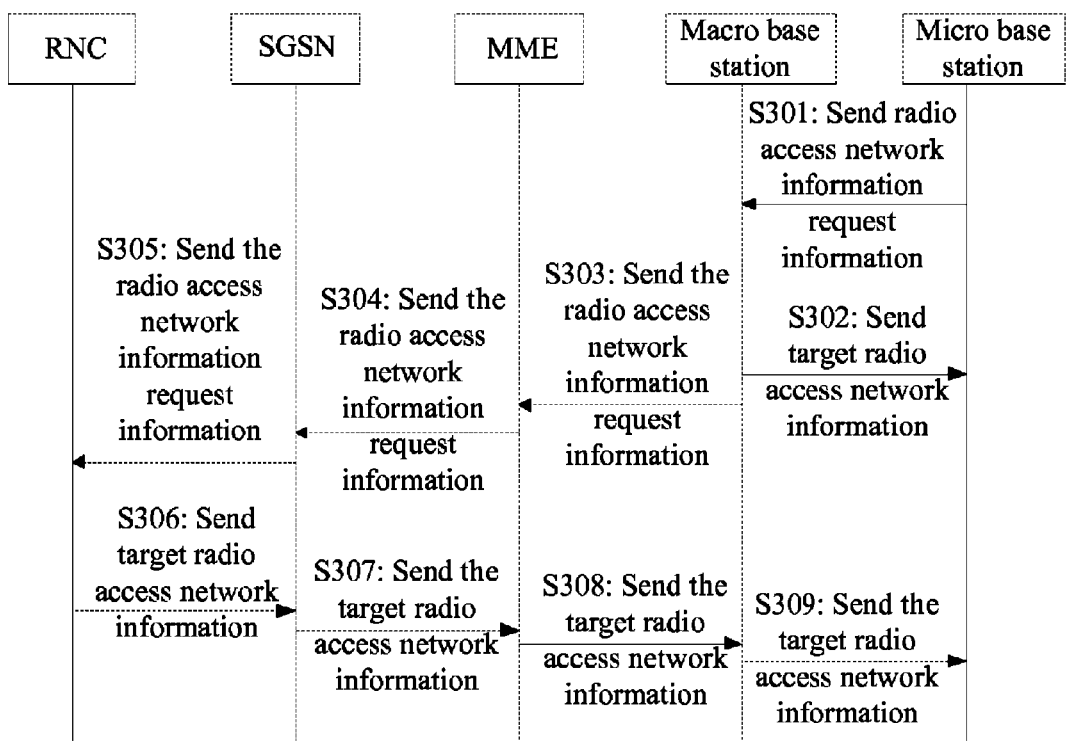
FIG. 3 is a signaling flowchart of a method for obtaining radio access network information according to an embodiment of the present invention.

FIG. 3 is a signaling flowchart of a method for obtaining radio access network information according to an embodiment of the present invention. As shown in FIG. 3, the method for obtaining radio access network information according to this embodiment may be specifically applied when a radio access network information request is performed between radio access network controllers of different radio access network standards. These different radio access network standards may specifically be global system for mobile communications (GSM), LTE, UMTS and the like. For example, an LTE communication system can support a service for network access or data downloading and a GSM communication system can support a voice service. When a terminal device initiates a service for data downloading in the GSM communication system, data transmission between the GSM communication system and the LTE communication system is required to complete the service for data downloading. In this process, radio access network information of the LTE system needs to be obtained to facilitate data transmission. It should be noted that this embodiment is not limited to this application scenario and is applicable to a scenario where radio access network information is exchanged between any different standards. The method for obtaining radio access network information according to this embodiment is described in detail by using an example where a first radio access network controller, a second radio access network controller and a first core network entity are entity apparatuses of an LTE communication system, where specifically, the first radio access network controller is a micro base station, the second radio access network controller is a macro base station and the first core network entity is an MME; and a third radio access network controller and a second core network entity are entity apparatuses of a UMTS communication system, where specifically, the third radio access network controller is an RNC and the second core network entity is an SGSN. The method for obtaining radio access network information according to this embodiment specifically includes the following steps:

S301: A micro base station sends radio access network information request information to a macro base station.

In this embodiment, the radio access network information request information may be used to request target radio access network information, where the target radio access network information is radio access network information of an RNC. The radio access network information request information may be carried in a resource status request message and the radio access network information request information may include any one or a combination of a destination cell identifier, a type of first radio access network information request information, or sending mode indication information. For example, the destination cell identifier is a unique identifier that identifies a UMTS cell in a network and the type of first radio access network information request information may be SI or load.

S302: The macro base station sends the target radio access network information to the micro base station.

Specifically, after receiving the radio access network information request information from the micro base station, if the macro base station determines, according to the radio access network information request information, that the target radio access network information exists locally, the macro base station sends the target radio access network information to the micro base station.

The macro base station sends, according to the radio access network information request information, the target radio access network information to the micro base station in a unicast manner; or the macro base station may send the target radio access network information in a broadcast manner. Furthermore, the macro base station may also send the target radio access network information according to a sending mode indicated by sending mode indication information carried in the radio access network information request information, where the sending mode may include sending randomly, sending once, sending multiple times, or sending periodically. A specific sending mode is similar to that in the description in the foregoing embodiment, which is not described repeatedly herein.

It should be noted that the target radio access network information may be carried in a resource status response message or a resource status update message, where the target radio access network information includes a destination cell identifier and/or requested cell information.

S303: The macro base station sends the radio access network information request information to an MME.

Specifically, after receiving the radio access network information request information from the micro base station, if the macro base station determines, according to the radio access network information request information, that the target radio access network information does not exist locally, the macro base station sends the radio access network information request information to the MME.

S304: The MME sends the radio access network information request information to an SGSN.

S305: The SGSN sends the radio access network information request information to a RNC.

S306: The RNC sends target radio access network information to the SGSN.

Specifically, the RNC sends, according to the radio access network information request information, the target radio access network information to the SGSN connected to the RNC, where the target radio access network information carries information, such as a load condition of the RNC, requested in the radio access network information request information. Content of information carried in the target radio access network information depends on content of the radio access network information request information, where no limitation is set herein.

S307: The SGSN sends the target radio access network information to the MME.

S308: The MME sends the target radio access network information to the macro base station.

S309: The macro base station sends the target radio access network information to the micro base station.

Specifically, the macro base station sends, according to an instruction of sending mode indication information carried in the radio access network information request information, the target radio access network information to the corresponding micro base station. The sending mode may include sending randomly, sending once, sending multiple times, or sending periodically. A specific sending mode is similar to that in the description in the foregoing embodiment, which is not described repeatedly herein. Meanwhile, the second radio access network controller may also store the target radio access network information. In this way, when the micro base station or another radio access network controller controlled by the MME requests the target radio access network information again, the macro base station may directly obtain the locally stored target radio access network information without obtaining the target radio access network information again by using the MME and the SGSN.

A specific form of the target radio access network information may be a BSSGP RIM PDU defined in the 3GPP specification 48.018. Specifically, in a radio access network information protocol data unit, a source cell identifier is an identifier of an RNC and a destination cell identifier is an identifier of a micro base station; in a radio access network information management container, a reported cell is a cell under an RNC.

According to the foregoing embodiment, in the method for obtaining radio access network information according to this embodiment, the macro base station sends, by determining that the target radio access network information exists locally, the target radio access network information to the micro base station without involving the SGSN and the MME; and obtains the information from a third radio access network controller if determining that the target radio access network information does not exist locally. If the second radio access network controller stores the information locally, when the first radio access network controller or another access network node of a first radio access network standard requests the target radio access network information again, the second radio access network controller may directly obtain the locally stored target radio access network information without obtaining the target radio access network information again by using a first core network entity and a second core network entity. Therefore, this reduces, to a certain extent, a case where the core network entities repeatedly transmit the same radio access network information multiple times, thereby reducing resource waste, improving a resource utilization rate and reducing a burden on a source core network entity and a target core network entity.

Figure 4:
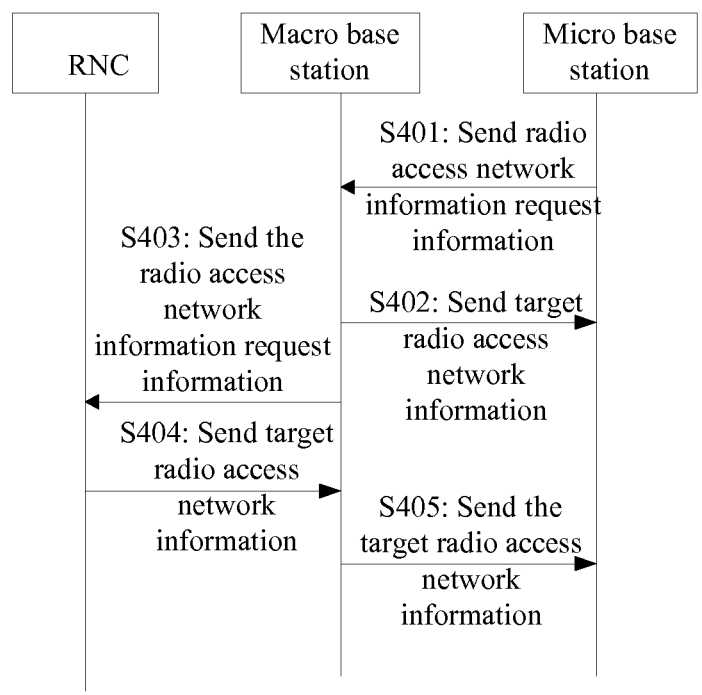
FIG. 4 is a signaling flowchart of a method for obtaining radio access network information according to another embodiment of the present invention.

FIG. 4 is a signaling flowchart of a method for obtaining radio access network information according to another embodiment of the present invention. As shown in FIG. 4, this embodiment is similar to the embodiment shown in FIG. 3, where a difference lies in that information transmission between a macro base station and an RNC is performed through a port between the macro base station and the RNC, instead of transmitting radio access network information request information or target radio access network information by using a core network SGSN and an MME in the embodiment shown in FIG. 3. Specifically, for example, a first radio access network standard is LTE, a first radio access network controller is a micro base station and a second radio access network controller is a macro base station. When a second radio access network standard is UMTS, a third radio access network controller is an RNC. The method for obtaining radio access network information according to this embodiment is described in detail. The method for obtaining radio access network information according to this embodiment specifically includes the following steps.

S401: A micro base station sends radio access network information request information to a macro base station.

S402: The macro base station sends target radio access network information to the micro base station.

Implementation manners of S401 and S402 are similar to those of S301 and S302 in FIG. 3, which are not described repeatedly herein.

S403: The macro base station sends the radio access network information request information to an RNC through a port between the macro base station and the RNC.

Specifically, after receiving the radio access network information request information from the micro base station, if the macro base station determines, according to the radio access network information request information, that the target radio access network information does not exist locally, the macro base station sends the radio access network information request information to the RNC.

S404: The RNC sends target radio access network information to the macro base station.

Specifically, the RNC sends, according to the radio access network information request information, the target radio access network information to the macro base station, where the target radio access network information carries information, such as a load condition of the RNC, requested in the radio access network information request information. Content of information carried in the target radio access network information depends on content of the radio access network information request information, where no limitation is set herein.

S405: The macro base station sends the target radio access network information to the micro base station.

Specifically, the macro base station sends the target radio access network information to the corresponding micro base station and sends, according to an instruction of sending mode indication information carried in the radio access network information request information, the target radio access network information to the first radio access network controller. The sending mode may include sending randomly, sending once, sending multiple times, or sending periodically. A specific sending mode is similar to that in the description in the foregoing embodiment, which is not described repeatedly herein. Meanwhile, the second radio access network controller may also store the target radio access network information. In this way, when the micro base station or another radio access network controller under the macro base station requests the target radio access network information again, the macro base station may directly obtain the locally stored target radio access network information without obtaining the target radio access network information again.

According to the foregoing embodiment, in the method for obtaining radio access network information according to this embodiment, the target radio access network information or the radio access network information request information is transmitted through the port between the macro base station and the RNC, which does not need to be obtained again by using a first core network entity and a second core network entity. Therefore, this reduces, to a certain extent, a case where the core network entities repeatedly transmit the same radio access network information multiple times, thereby reducing resource waste, improving a resource utilization rate and reducing a burden on a source core network entity and a target core network entity.

Figure 5:
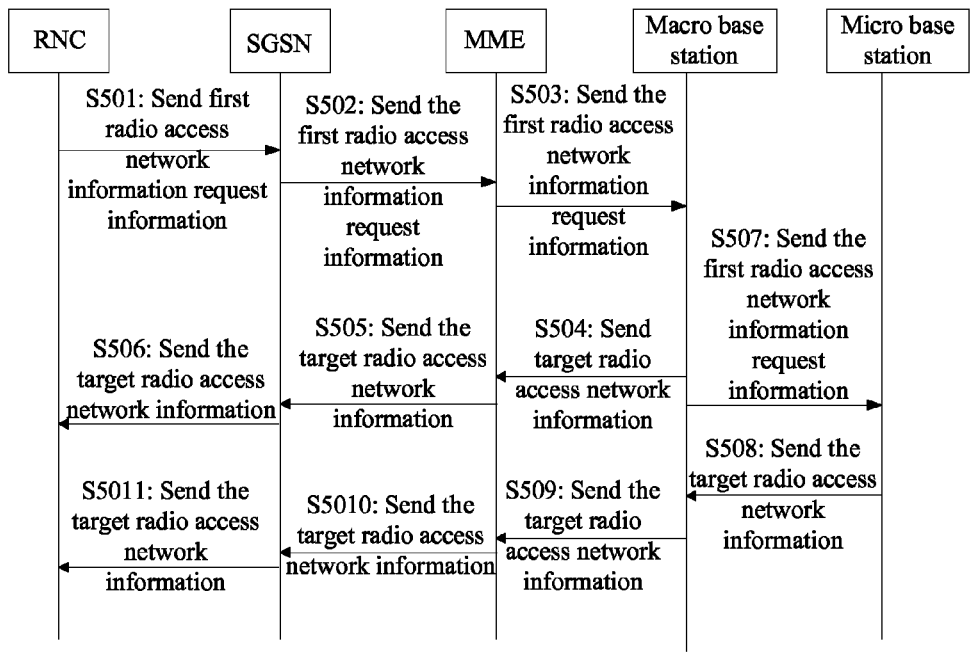
FIG. 5 is a signaling flowchart of a method for obtaining radio access network information according to another embodiment of the present invention.

FIG. 5 is a schematic flowchart of a method for obtaining radio access network information according to another embodiment of the present invention. As shown in FIG. 5, a first radio access network controller is an access network node of a first radio access network standard and a first core network entity is a core network node of the first radio access network standard. A second radio access network controller and a third radio access network controller are access network nodes of a second radio access network standard respectively and a second core network entity is a core network node of the second radio access network standard. The following describes the method for obtaining radio access network information according to this embodiment in detail by using an example where the first radio access network standard is UMTS, the first radio access network controller is an RNC, the first core network entity is an SGSN, the second radio access network standard is LTE, the second radio access network controller is a macro base station, the third radio access network controller is one micro base station within a coverage range of the macro base station and the second core network entity is an MME. It should be noted that this embodiment is not limited to this application scenario and is applicable to a scenario where radio access network information is exchanged between any different standards. Specifically, the method for obtaining radio access network information according to this embodiment specifically includes the following steps:

S501: An RNC sends first radio access network information request information to an SGSN.

Specifically, in this embodiment, the first radio access network information request information may be used to request target radio access network information, where the target radio access network information is radio access network information of a micro base station of a second radio access network standard.

A format in which the first radio access network information request information is sent may be a BSSGP RIM PDU defined in the 3GPP specification 48.018. Specifically, in a radio access network information request protocol data unit, a source cell identifier is an identifier of an RNC and a destination cell identifier is an identifier of a macro base station; in a radio access network information management container, a requested cell is a cell under a micro base station or under a macro base station and a micro base station.

S502: The SGSN sends the first radio access network information request information to an MME.

Specifically, the SGSN sends, according to the first radio access network information request information, the first radio access network information request information to the core network entity MME of the second radio access network standard where the micro base station is located.

S503: The MME sends the first radio access network information request information to a macro base station.

Specifically, the MME sends, according to the first radio access network information request information, the first radio access network information request information to the macro base station connected to the micro base station.

S504: The macro base station sends target radio access network information to the MME.

After receiving the first radio access network information request information from the MME, if the macro base station determines, according to the first radio access network information request information, that the target radio access network information, that is, radio access network information of the micro base station, exists locally, the macro base station sends the target radio access network information to the MME, where the target radio access network information carries information, such as a load condition of the micro base station, requested in the radio access network information request information. Content of information carried in the target radio access network information depends on content of the first radio access network information request information, where no limitation is set herein.

Furthermore, the macro base station may also send the target radio access network information to the RNC according to a sending mode indicated by sending mode indication information carried in the radio access network information request information, where the sending mode may include sending randomly, sending once, sending multiple times, or sending periodically. A specific sending mode is similar to that in the description in the foregoing embodiment, which is not described repeatedly herein.

A format in which the target radio access network information is sent may be a BSSGP RIM PDU defined in the 3GPP specification 48.018. Specifically, in a radio access network information protocol data unit, a destination cell identifier is an identifier of an RNC and a source cell identifier is an identifier of a macro base station; in a radio access network information management container, a reported cell is a cell under a micro base station or under a macro base station and a micro base station.

S505: The MME sends the target radio access network information to the SGSN.

S506: The SGSN sends the target radio access network information to the RNC.

S507: The macro base station sends second radio access network information request information to the micro base station.

Specifically, after receiving the first radio access network information request information from the MME, if the macro base station determines, according to the first radio access network information request information, that the target radio access network information does not exist locally, the macro base station sends the second radio access network information request information to the micro base station, where the second radio access network information request information may carry the same content as the first radio access network information request information, or a part of the content carried in the first radio access network information request information. The radio access network information request information may be carried in a resource status request message and the radio access network information request information may include any one or a combination of a destination cell identifier, a type of first radio access network information request information, or sending mode indication information. For example, the destination cell identifier is a unique identifier that identifies the UMTS cell in a network and the type of first radio access network information request information may be SI or load.

A cell requested by the RNC may locate in multiple micro base stations. Therefore, the micro base station needs to send the radio access network information request information to multiple base stations in which the requested cell locates.

It should be noted that a format in which the second radio access network information request information is sent may be a format of a BSSGP RIM PDU defined in the 3GPP specification 48.018. Specifically, in a radio access network information request protocol data unit, a destination cell identifier is an identifier of a micro base station and a source cell identifier is an identifier of a macro base station; in a radio access network information management container, a requested cell is a cell under a micro base station.

S508: The micro base station sends the target radio access network information to the macro base station.

Specifically, a specific format of the target radio access network information may be a format of a BSSGP RIM PDU defined in the 3GPP specification 48.018. Specifically, in a radio access network information protocol data unit, a destination cell identifier is an identifier of an RNC and a source cell identifier is an identifier of a micro base station; in a radio access network information management container, a reported cell is a cell under a micro base station.

It should be noted that the target radio access network information may be carried in a resource status response message or a resource status update message, where the target radio access network information includes a destination cell identifier and/or requested cell information.

Specifically, the micro base station sends, according to the second radio access network information request information, the target radio access network information to the macro base station connected to the micro base station, where the target radio access network information carries information, such as a load condition of the micro base station, requested in the second radio access network information request information.

If the second radio access network information request information carries type indication information for indicating a type of the target radio access network information, the target radio access network information may carry corresponding information, that is, at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, cell attribute information, universal terrestrial radio access information, a self-organizing network information and a multimedia broadcast and multicast service information. The cell type may be information such as a macro cell, a micro cell, or a femto cell. The cell attribute information may be whether a current cell and a neighboring cell of the current cell are co-sited, share an antenna and share a building base band unit (BBU), cell bandwidth, that is, a supported maximum data rate, a service attribute of a cell, cell channel bandwidth, a cell size and access control information of the cell, where the service attribute of the cell may be a supported service class, a supported quality of service class identifier (QCI), the cell channel bandwidth, the cell size such as a cell radius and the access control information of the cell, such as an access class (AC), domain specific access control (DSAC), paging permission with access control (PPAC) and whether being a cell reserved by a carrier.

S509: The macro base station sends the target radio access network information to the MME.

If the target radio access network information carries sending mode indication information, the macro base station sends, according to an instruction of the sending mode indication information, the target radio access network information to the first radio access network controller. The sending mode may include sending randomly, sending once, sending multiple times, or sending periodically. A specific sending mode is similar to that in the description in the foregoing embodiment, which is not described repeatedly herein. Meanwhile, the macro base station may also store the target radio access network information. In this way, when another micro base station, an SGSN, or another radio access network controller under the MME requests the target radio access network information again, the macro base station may directly obtain the locally stored target radio access network information without obtaining the target radio access network information again.

S510: The MME sends the target radio access network information to the SGSN.

S511: The SGSN sends the target radio access network information to the RNC.

According to the foregoing embodiment, in the method for obtaining radio access network information according to this embodiment, the RNC sends radio access network information request information to the macro base station and the macro base station stores the target radio access network information; when the first radio access network controller requests radio access network information of multiple third radio access network controllers, the second radio access network controller may directly obtain the locally stored target radio access network information and the first radio access network controller does not need to send radio access network information request information respectively to the multiple third radio access network controllers to obtain the radio access network information. This reduces, to a certain extent, a case where a core network entity transmits the radio access network information multiple times, thereby reducing resource waste, improving a resource utilization rate and reducing a burden on a source core network entity and a target core network entity.

Another implementation manner may be an implementation manner of the method for obtaining radio access network information, which is similar to the embodiment shown in FIG. 5, where a difference lies in that the first radio access network information request information or target radio access network information is transmitted between the RNC and the macro base station without involving core network entities SGSN and MME and the first radio access network information request information or target radio access network information is transmitted through a port between the RNC and the macro base station.

Figure 6:
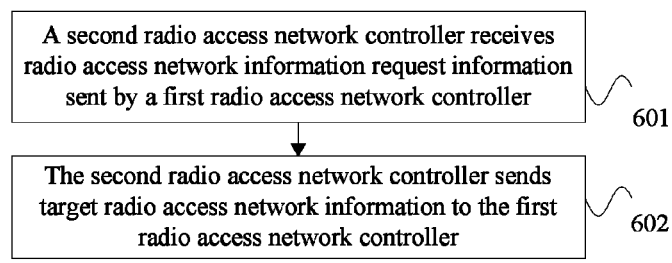
FIG. 6 is a schematic flowchart of a method for obtaining radio access network information according to another embodiment of the present invention.

FIG. 6 is a signaling flowchart of a method for obtaining radio access network information according to another embodiment of the present invention. As shown in FIG. 6, the method for obtaining radio access network information specifically includes the following steps:

S601: A second radio access network controller receives radio access network information request information from a first radio access network controller, where the radio access network information request information is used to request target radio access network information; the target radio access network information is radio access network information of the second radio access network controller; and the first radio access network controller and the second radio access network controller are access network nodes of different radio access network standards.

In this embodiment, when the first radio access network controller of the first radio access network standard needs to request radio access network information of the second radio access network controller of the second radio access network standard, the second radio access network controller may receive the first radio access network information request information from the first radio access network controller of the first radio access network standard. For example, the second radio access network standard is UMTS; the second radio access network controller may be an RNC; the first radio access network standard is LTE; and the first radio access network controller is an eNB. An application scenario of this embodiment is not limited thereto and may also be that the first radio access network standard is UMTS, the second radio access network standard is LTE, or the first radio access network standard is GSM, as long as persons skilled in the art may understand that the first radio access network standard and the second radio access network standard herein are different access network standards.

Specifically, the second radio access network controller receives, through a port configured between the first radio access network controller and the second radio access network controller, the radio access network information request information from the first radio access network controller, which is in contrary to the prior art where the second radio access network controller receives, by using a first core network and a second core network, the radio access network information request information from the first radio access network controller, where the first core network is a core network node of the first radio access network standard and the second core network is a core network node of the second radio access network standard.

In this embodiment, the radio access network information request information is referred to as first radio access network information request information to facilitate differentiation. The first radio access network information request information is used to request target radio access network information, where the target radio access network information may be radio access network information of the third radio access network controller.

S602: The second radio access network controller sends the target radio access network information to the first radio access network controller.

In this embodiment, after receiving the first radio access network information request information sent, through the port configured between the first radio access network controller and the second radio access network controller, by the first radio access network controller, the second radio access network controller sends the target radio access network information to the first radio access network controller according to the first radio access network information request information through the port configured between the first radio access network controller and the second radio access network controller.

In the foregoing embodiment, the target radio access network information or the radio access network information request information is transmitted through a port between a macro base station and an RNC, which does not need to be obtained again by using a first core network entity and a second core network entity. Therefore, this reduces, to a certain extent, a case where the core network entities repeatedly transmit the same radio access network information multiple times, thereby reducing resource waste, improving a resource utilization rate and reducing a burden on a source core network entity and a target core network entity.

In an optional implementation manner, besides representing a request for the target radio access network information, the first radio access network information request information from the first radio access network controller and received by the second radio access network controller may further carry sending mode indication information, where the sending mode indication information is used to indicate a mode for the second radio access network controller to send the target radio access network information to the first radio access network controller. On such a basis, an implementation manner of S602 includes: sending, by the second radio access network controller according to a sending mode indicated by the sending mode indication information, the target radio access network information to the first radio access network controller, where the sending mode indication may include an indication of sending randomly, an indication of sending once, an indication of sending multiple times and an indication of sending periodically.

For example, a sending mode indicated by the mode indication of sending randomly may be sending at any moment; and accordingly the second radio access network controller sends the target radio access network information to the first radio access network controller at any moment;

or, a sending mode indicated by the mode indication of sending periodically may be sending periodically; and accordingly the second radio access network controller may send the target radio access network information to the first radio access network controller periodically;

or, the mode indication of sending once specifically indicates sending time for the second radio access network controller to send the target radio access network information to the first radio access network controller once; and accordingly the second radio access network controller may send the target radio access network information to the first radio access network controller at the sending time indicated by the sending mode indication;

or, the mode indication of sending multiple times may instruct the second radio access network controller to send, when a change occurs on the target radio access network information, the target radio access network information to the first radio access network controller; and accordingly the second radio access network controller sends, according to the instruction of the sending mode indication, changed target radio access network information to the first radio access network controller when a change occurs on the target radio access network information.

Furthermore, the first radio access network information request information from the first radio access network controller and received by the second radio access network controller carries the sending mode indication information, where the sending mode indication information may be used to indicate a mode for the second radio access network controller to send the target radio access network information to the first radio access network controller; and accordingly before sending the target radio access network information to the first radio access network controller, the second radio access network controller needs to receive the sending mode indication information from the first radio access network controller first and then sends the target radio access network information to the first radio access network controller according to the sending mode indication information.

In the foregoing embodiment, the radio access network information request information may further carry type indication information for indicating a type of the target radio access network information.

Specifically, the target radio access network information includes one or any combination of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Figure 7:
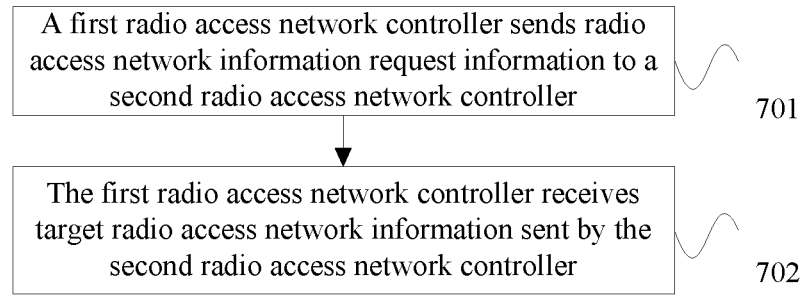
FIG. 7 is a schematic flowchart of a method for obtaining radio access network information according to another embodiment of the present invention.

FIG. 7 is a schematic flowchart of a method for obtaining radio access network information according to another embodiment of the present invention. As shown in FIG. 7, a method for obtaining radio access network information specifically includes the following steps:

S701: A first radio access network controller sends radio access network information request information to a second radio access network controller, where the radio access network information request information is used to request target radio access network information; the target radio access network information is radio access network information of the second radio access network controller; and the first radio access network controller and the second radio access network controller are access network nodes of different radio access network standards.

In this embodiment, when the first radio access network controller of the first radio access network standard needs to request radio access network information of the second radio access network controller of the second radio access network standard, the first radio access network controller may send the radio access network information request information to the second radio access network controller. For example, the second radio access network standard is UMTS; the second radio access network controller may be an RNC; the first radio access network standard is LTE; and the first radio access network controller may be an eNB. An application scenario of this embodiment is not limited thereto and may also be that the first radio access network standard is UMTS, the second radio access network standard is LTE, or the first radio access network standard is GSM, as long as persons skilled in the art may understand that the first radio access network standard and the second radio access network standard herein are different access network standards.

Specifically, the first radio access network controller directly sends, through a port configured between the first radio access network controller and the second radio access network controller, the radio access network information request information to the second radio access network controller, which is in contrary to the prior art where the second radio access network controller receives, by using a first core network and a second core network, the radio access network information request information from the first radio access network controller, where the first core network is a core network node of the first radio access network standard and the second core network is a core network node of the second radio access network standard.

S702: The first radio access network controller receives the target radio access network information from the second radio access network controller.

In this embodiment, after receiving the first radio access network information request information sent, through the port configured between the first radio access network controller and the second radio access network controller, by the first radio access network controller, the second radio access network controller sends the target radio access network information to the first radio access network controller according to the first radio access network information request information through the port configured between the first radio access network controller and the second radio access network controller; and the first radio access network controller receives the target radio access network information sent, through the port configured between the first radio access network controller and the second radio access network controller, by the second radio access network controller.

According to the foregoing embodiment, in the method for obtaining radio access network information according to this embodiment, the first radio access network controller sends, through the port configured between the first radio access network controller and the second radio access network controller, the radio access network information request information to the second radio access network controller and receives, through the port, the target radio access network information from the second radio access network controller without involving a first core network entity and a second core network entity. Therefore, this reduces, to a certain extent, a case where the core network entities transmit the radio access network information multiple times, thereby reducing resource waste, improving a resource utilization rate and reducing a burden on a source core network entity and a target core network entity.

In an optional implementation manner, besides representing a request for the target radio access network information, the radio access network information request information from the first radio access network controller to the second radio access network controller may further carry sending mode indication information, where the sending mode indication information is used to indicate a mode for the second radio access network controller to send the target radio access network information to the first radio access network controller. On such a basis, an implementation manner of S702 includes: receiving, by the first radio access network controller, the target radio access network information that is from the second radio access network controller according to a sending mode indicated by the sending mode indication information, where the sending mode indication may include an indication of sending randomly, an indication of sending once, an indication of sending multiple times and an indication of sending periodically.

For example, a sending mode indicated by the mode indication of sending randomly may be sending at any moment; and accordingly the second radio access network controller sends the target radio access network information to the first radio access network controller at any moment;

or, a sending mode indicated by the mode indication of sending periodically may be sending periodically; and accordingly the second radio access network controller may send the target radio access network information to the first radio access network controller periodically;

or, the mode indication of sending once specifically indicates sending time for the second radio access network controller to send the target radio access network information to the first radio access network controller once; and accordingly the second radio access network controller may send the target radio access network information to the first radio access network controller at the sending time indicated by the sending mode indication;

or, the mode indication of sending multiple times may instruct the second radio access network controller to send, when a change occurs on the target radio access network information, the target radio access network information to the first radio access network controller; and accordingly the second radio access network controller sends, according to the instruction of the sending mode indication, changed target radio access network information to the first radio access network controller when a change occurs on the target radio access network information.

In the foregoing embodiment, the radio access network information request information may further carry type indication information for indicating a type of the target radio access network information.

Specifically, the target radio access network information includes one or any combination of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Figure 8:
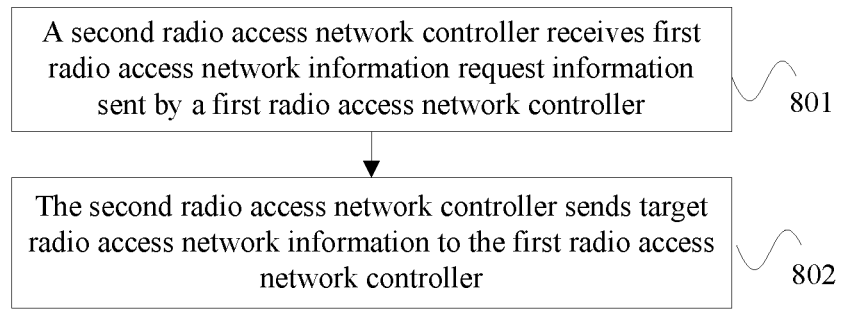
FIG. 8 is a schematic flowchart of a method for obtaining radio access network information according to another embodiment of the present invention.

FIG. 8 is a schematic flowchart of a method for obtaining radio access network information according to another embodiment of the present invention. As shown in FIG. 8, a method for obtaining radio access network information specifically includes the following steps:

S801: A second radio access network controller receives first radio access network information request information from a first radio access network controller, where the first radio access network information request information is used to request target radio access network information; the target radio access network information is radio access network information of a third radio access network controller; and the first radio access network controller, the second radio access network controller and the third radio access network controller are different access network nodes of the same radio access network standard.

In this embodiment, an access network node of the radio access network standard may include one first radio access network controller, one second radio access network controller and at least one third radio access network controller. Coverage ranges of the second radio access network controller and the first radio access network controller are independent of each other. The second radio access network controller is related to the third radio access network controller in at least two cases. In one case, the second radio access network controller is a macro base station and the third radio access network controller is one micro base station in at least one micro base station within a coverage range of the macro base station. It should be noted that a macro base station can provide a large coverage range; however, a coverage hole or some hotspot areas may exist in the coverage range of the macro base station, resulting in a case where access of a user equipment fails. Therefore, a micro base station may be set up in these areas to fill the coverage hole or expand capacity for the macro base station. In another case, the second radio access network controller has a coverage range independent of that of each third radio access network controller.

In this embodiment, no matter how the second radio access network controller is related to the third radio access network controller, when at least one first radio access network controller requests the same target radio access network information from the third radio access network controller, the second radio access network controller sends a request to the third radio access network controller once, so as to obtain the target radio access network information.

In this embodiment, the radio access network controllers are configured to allow multiple first radio access network controllers to send radio access network information request information to the second radio access network controller to request the target radio access network information.

Specifically, the second radio access network controller receives the radio access network information request information from the first radio access network controller, where the radio access network information request information is referred to as first radio access network information request information to facilitate differentiation. The first radio access network information request information is used to request target radio access network information, where the target radio access network information may be radio access network information of the third radio access network controller.

S802: The second radio access network controller sends the target radio access network information to the first radio access network controller.

In this embodiment, after receiving the first radio access network information request information from the first radio access network controller, the second radio access network controller determines, according to the first radio access network information request information, whether the target radio access network information exists locally. If the target radio access network information exists locally on the second radio access network controller, the second radio access network controller sends the target radio access network information to the first radio access network controller. If the target radio access network information does not exist locally on the second radio access network controller, the second radio access network controller sends second radio access network information request information to the third radio access network controller; and the second radio access network controller receives radio access network information from the third radio access network controller and then sends the target radio access network information to the first radio access network controller, where the second radio access network information request information may carry the same content as the first radio access network information request information, or the second radio access network information request information may carry content that is partially the same as content carried in the first radio access network information request information.

In this embodiment, the target radio access network information stored in the second radio access network controller may be configured and stored in a manner of network configuration, where specifically: before receiving the first radio access network information request information, the second radio access network controller obtains, according radio access network information request information from another radio access network controller, the radio access network information of the third radio access network controller by using a core network node of the radio access network standard where it is located, or obtains the radio access network information of the third radio access network controller through a port between the second radio access network controller and the third radio access network controller; and then stores the target radio access network information locally; or before receiving the first radio access network information request information, the second radio access network controller proactively sends radio access network information request information and the third radio access network controller by using a core network entity of the radio access network standard where it is located, or proactively obtains the radio access network information of the third radio access network controller through a port between the second radio access network controller and the third radio access network controller; and then stores the target radio access network information locally.

The sending, by the second radio access network controller, the target radio access network information to the first radio access network controller may include: sending, by the second radio access network controller, the target radio access network information to the first radio access network controller in a unicast manner. Alternatively, the second radio access network controller may also send the target radio access network information to the first radio access network controller in a broadcast manner.

According to the foregoing embodiment, in the method for obtaining radio access network information according to this embodiment, the second radio access network controller receives the first radio access network information request information from the first radio access network controller; and determines whether the target radio access network information exists locally; and if a determining result indicates that the target radio access network information exists locally, the second radio access network controller sends the target radio access network information to the first radio access network controller without sending information to the third radio access network controller, thereby reducing, to a certain extent, a burden on a network between the first radio access network controller and the third radio access network controller.

Furthermore, if the second radio access network controller determines that the target radio access network information does not exist locally, the second radio access network controller receives the target radio access network information that is from the third radio access network controller according to the second radio access network information request information; and the second radio access network controller sends the target radio access network information to the first radio access network controller and stores the target radio access network information or does not store the information. If the second radio access network controller stores the information locally, when the first radio access network controller or another access network node of the radio access network standard requests the target radio access network information again, the second radio access network controller may direct obtain the target radio access network information locally without sending information to the third radio access network controller, thereby reducing, to a certain extent, a burden on a network between the first radio access network controller and the third radio access network controller.

In an optional implementation manner, besides representing a request for the target radio access network information, the first radio access network information request information from the first radio access network controller to the second radio access network controller may further carry sending mode indication information, where the sending mode indication information is used to indicate a mode for the second radio access network controller to send the target radio access network information to the first radio access network controller. On such a basis, an implementation manner of S802 includes: sending, by the second radio access network controller according to a sending mode indicated by the sending mode indication, the target radio access network information to the first radio access network controller, where the sending mode indication may include an indication of sending randomly, an indication of sending once, an indication of sending multiple times and an indication of sending periodically.

For example, a sending mode indicated by the mode indication of sending randomly may be sending at any moment; and accordingly the second radio access network controller sends the target radio access network information to the first radio access network controller at any moment;

or, a sending mode indicated by the mode indication of sending periodically may be sending periodically; and accordingly the second radio access network controller may send the target radio access network information to the first radio access network controller periodically;

or, the mode indication of sending once specifically indicates sending time for the second radio access network controller to send the target radio access network information to the first radio access network controller once; and accordingly the second radio access network controller may send the target radio access network information to the first radio access network controller at the sending time indicated by the sending mode indication;

or, the mode indication of sending multiple times may instruct the second radio access network controller to send, when a change occurs on the target radio access network information, the target radio access network information to the first radio access network controller; and accordingly the second radio access network controller sends, according to the instruction of the sending mode indication, changed target radio access network information to the first radio access network controller when a change occurs on the target radio access network information.

Furthermore, the first radio access network information request information from the first radio access network controller and received by the second radio access network controller carries the sending mode indication information, where the sending mode indication information may be used to indicate a mode for the second radio access network controller to send the target radio access network information to the first radio access network controller; and accordingly before sending the target radio access network information to the first radio access network controller, the second radio access network controller needs to receive the sending mode indication information from the first radio access network controller first and then sends the target radio access network information to the first radio access network controller according to the sending mode indication information.

In the foregoing embodiment, the first radio access network information request information may further carry type indication information for indicating a type of the target radio access network information.

Specifically, the target radio access network information includes one or any combination of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Figure 9:
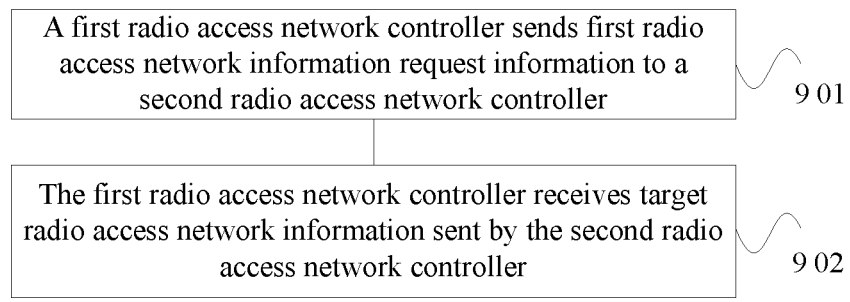
FIG. 9 is a schematic flowchart of a method for obtaining radio access network information according to another embodiment of the present invention.

FIG. 9 is a schematic flowchart of a method for obtaining radio access network information according to another embodiment of the present invention. As shown in FIG. 9, the method for obtaining radio access network information includes the following steps:

S901: A first radio access network controller sends first radio access network information request information to a second radio access network controller, where the first radio access network information request information is used to request target radio access network information; the target radio access network information is radio access network information of a third radio access network controller; and the first radio access network controller, the second radio access network controller and the third radio access network controller are different access network nodes of the same radio access network standard.

In this embodiment, an access network node of the radio access network standard may include one second radio access network controller, one first radio access network controller and at least one third radio access network controller. The second radio access network controller is related to the third radio access network controller in at least two cases. In one case, the second radio access network controller is a macro base station and the third radio access network controller is one micro base station in at least one micro base station within a coverage range of the macro base station. In another case, the second radio access network controller has a coverage range independent of that of each third radio access network controller.

No matter how the second radio access network controller is related to the third radio access network controller, the second radio access network controller only needs to send a request to the third radio access network controller once to obtain the radio access network information of the third radio access network controller and then may provide the same target radio access network information to the at least one first radio access network controller.

No matter how the second radio access network controller is related to the third radio access network controller, in this embodiment, the radio access network controllers are configured to allow multiple first radio access network controllers to send radio access network information request information to the second radio access network controller to request the same target radio access network information.

Specifically, the first radio access network controller sends the radio access network information request information to the second radio access network controller, where the radio access network information request information is referred to as first radio access network information request information to facilitate differentiation. The first radio access network information request information is used to request target radio access network information, where the target radio access network information may be radio access network information of the third radio access network controller.

S902: The first radio access network controller receives the target radio access network information from the second radio access network controller.

In this embodiment, after receiving the first radio access network information request information from the first radio access network controller, the second radio access network controller determines, according to the first radio access network information request information, whether the target radio access network information exists locally. If the target radio access network information exists locally on the second radio access network controller, the second radio access network controller sends the target radio access network information to the first radio access network controller. If the target radio access network information does not exist locally on the second radio access network controller, the second radio access network controller sends second radio access network information request information to the third radio access network controller; and the second radio access network controller receives radio access network information from the third radio access network controller and then sends the target radio access network information to the first radio access network controller, where the second radio access network information request information may carry the same content as the first radio access network information request information, or the second radio access network information request information may carry content that is partially the same as content carried in the first radio access network information request information.

In this embodiment, the target radio access network information stored in the second radio access network controller may be configured and stored in a manner of network configuration, where specifically: before receiving the first radio access network information request information, the second radio access network controller obtains, according radio access network information request information from another radio access network controller, the radio access network information of the third radio access network controller by using a core network node of the radio access network standard, or obtains the radio access network information of the third radio access network controller through a port between the second radio access network controller and the third radio access network controller; and then stores the target radio access network information locally; or before receiving the first radio access network information request information, the second radio access network controller proactively sends radio access network information request information to the third radio access network controller by using a core network entity of the radio access network standard where it is located, or proactively obtains the radio access network information of the third radio access network controller through a port between the second radio access network controller and the third radio access network controller; and then stores the target radio access network information locally.

According to the foregoing embodiment, in the method for obtaining radio access network information according to this embodiment, the first radio access network controller sends the first radio access network information request information to the second radio access network controller; and then, the first radio access network controller receives the target radio access network information from the second radio access network controller, instead of obtaining the target radio access network information directly by using the a core network entity as in the prior art. Moreover, in a case where the target radio access network information exists locally on the second radio access network controller, the core network entity is not required to obtain the target radio access network information from the third radio access network controller. This reduces, to a certain extent, a case where the core network entities transmit the radio access network information multiple times, thereby reducing resource waste, improving a resource utilization rate and reducing a burden on a source core network entity and a target core network entity.

In an optional implementation manner, the first radio access network information request information from the first radio access network controller to the second radio access network controller may indicate that the first radio access network controller is going to request obtaining of the target radio access network information soon, so as to tell the second radio access network controller to get ready in a timely manner. In this way, when the first radio access network controller requests obtaining of the target radio access network information, the second radio access network controller can provide the target radio access network information in a timely manner. On such a basis, an implementation manner of S802 includes: sending, by the first radio access network controller, sending mode indication information to the second radio access network controller, where the sending mode indication information is used to indicate a mode for the second radio access network controller to send the target radio access network information to the first radio access network controller; and receiving, by the first radio access network controller, the target radio access network information that is from the second radio access network controller according to an instruction of the sending mode indication information. This implementation manner helps to ensure the timeliness for the first radio access network controller to obtain the target radio access network information.

In an optional implementation manner, besides representing a request for the target radio access network information, the first radio access network information request information from the first radio access network controller to the second radio access network controller may further carry sending mode indication for indicating a mode for the second radio access network controller to send the target radio access network information to the first radio access network controller. On such a basis, an implementation manner of S802 includes: receiving, by the first radio access network controller, the target radio access network information that is from the second radio access network controller according to a sending mode indicated by the sending mode indication, where the sending mode indication may include an indication of sending randomly, an indication of sending once, an indication of sending multiple times and an indication of sending periodically.

For example, a sending mode indicated by the mode indication of sending randomly may be sending at any moment; and accordingly the second radio access network controller sends the target radio access network information to the first radio access network controller at any moment; or, a sending mode indicated by the mode indication of sending periodically may be sending periodically; and accordingly the second radio access network controller may send the target radio access network information to the first radio access network controller periodically;

or, the mode indication of sending once specifically indicates sending time for the second radio access network controller to send the target radio access network information to the first radio access network controller once; and accordingly the second radio access network controller may send the target radio access network information to the first radio access network controller at the sending time indicated by the sending mode indication;

or, the mode indication of sending multiple times may instruct the second radio access network controller to send, when a change occurs on the target radio access network information, the target radio access network information to the first radio access network controller; and accordingly the second radio access network controller sends, according to the instruction of the sending mode indication, changed target radio access network information to the first radio access network controller when a change occurs on the target radio access network information.

Figure 10:
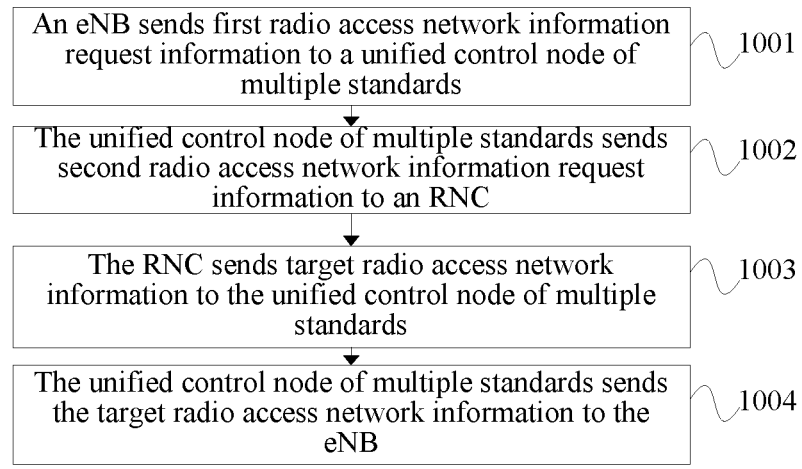
FIG. 10 is a schematic flowchart of a method for obtaining radio access network information according to another embodiment of the present invention.

FIG. 10 is a schematic flowchart of a method for obtaining radio access network information according to another embodiment of the present invention. As shown in FIG. 10, in this embodiment, a first radio access network controller is an access network node of a first radio access network standard, a third radio access network controller is an access network node of a second radio access network standard, a second radio access network controller is an intermediate node between the first radio access network controller and the third radio access network controller and the second radio access network controller does not belong to the first radio access network standard or the second radio access network standard, where the first radio access network controller is directly connected to the second radio access network controller by using an interface for a connection between access network nodes of the first radio access network standard and the third radio access network controller is connected to the second radio access network controller by using an interface for a connection between access network nodes of the second radio access network standard.

In an implementation manner of this embodiment, an application scenario may be that the first radio access network standard is LTE, the first radio access network controller is an eNB, the second radio access network standard is UMTS, the third radio access network controller is an RNC, the second radio access network controller is a unified control node of multiple standards, an interface between radio access network controllers of the first radio access network standard is X2 and an interface between radio access network controllers of the second radio access network standard is Iur.

It should be noted that this embodiment is not limited to this application scenario and is applicable to a scenario where radio access network information is exchanged between any different standards. Specifically, the method for obtaining radio access network information according to this embodiment specifically includes the following steps:

S1001: An eNB sends first radio access network information request information to a unified control node of multiple standards.

In this embodiment, the first radio access network information request information may be used to request target radio access network information, where the target radio access network information is radio access network information of an RNC of the second radio access network standard. The first radio access network information request information may be carried in any message of a common measurement request message, a resource status request message, a direct information transmission message, or a direct information transmission message of an evolved base station and is sent to the unified control node of multiple standards. The first radio access network information request information may include any one or a combination of a destination cell identifier, a type of first radio access network information request information, or sending mode indication information. The destination cell identifier (UTRAN Source Cell ID) is a unique identifier that identifies the UMTS cell in a network and the type of first radio access network information request information may be SI or load.

A specific form of the radio access network information request information may be a base station subsystem general packet radio service protocol radio access network information management protocol data unit (BSSGP RIM PDU) defined in the 3GPP specification 48.018 and herein is a radio access network information request protocol data unit RAN-INFORMATION-REQUEST PDU. In the RAN-INFORMATION-REQUEST PDU, a destination cell identifier is an identifier of an RNC; in a radio access network information management container, a requested cell is a cell under an RNC.

S1002: The unified control node of multiple standards sends second radio access network information request information to an RNC.

Specifically, after receiving the first radio access network information request information from the eNB, if the unified control node of multiple standards determines, according to the first radio access network information request information, that the target radio access network information does not exist locally, the unified control node of multiple standards sends the second radio access network information request information to the RNC by using an interface Iur connected to the RNC, where the second radio access network information request information may carry the same content as the first radio access network information request information, or a part of the content carried in the first radio access network information request information.

A specific form of the radio access network information request information may be a BSSGP RIM PDU defined in the 3GPP specification 48.018. Specifically, in a radio access network information request protocol data unit, a destination cell identifier is an identifier of an RNC and a source cell identifier is an identifier of an eNB or an identifier of a unified control node of multiple standards; in a radio access network information management container, a requested cell is a cell under an RNC.

The second radio access network information request information may be carried in any message of a common measurement request message, a resource status request message, a direct information transmission message, or a direct information transmission message of an evolved base station; for example, the unified control node of multiple standards may send a common measurement request message to the RNC. The second radio access network information request information may include any one or a combination of a destination cell identifier, a type of first radio access network information request information, or sending mode indication information; for example, the destination cell identifier is a unique identifier that identifies the UMTS cell in a network and the type of first radio access network information request information may be SI or load.

It should be noted that after receiving the first radio access network information request information from the eNB, if the unified control node of multiple standards determines, according to the first radio access network information request information, that the target radio access network information exists locally, that is, radio access network information of the RNC exists this time, the unified control node of multiple standards may send the target radio access network information to the eNB by using an interface X2 between the unified control node of multiple standards and the eNB, where the target radio access network information carries information, such as a load condition of the RNC, requested in the radio access network information request information. Content of information carried in the target radio access network information depends on content of the radio access network information request information, where no limitation is set herein.

S1003: The RNC sends target radio access network information to the unified control node of multiple standards.

Specifically, the RNC sends the target radio access network information to the unified control node of multiple standards according to the second radio access network information request information, where the target radio access network information carries information, such as a load condition, requested in the radio access network information request information.

A specific form of the target radio access network information may be a BSSGP RIM PDU defined in the 3GPP specification 48.018. Specifically, in a radio access network information protocol data unit, a source cell identifier is an identifier of an RNC and a destination cell identifier is an identifier of an eNB or an identifier of a unified control node of multiple standards; in a radio access network information management container, a reported cell is a cell under an RNC.

If the second radio access network information request information carries type indication information for indicating a type of the target radio access network information, the target radio access network information may carry corresponding information, that is, at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, cell attribute information, universal terrestrial radio access information, a self-organizing network information and a multimedia broadcast and multicast service information. The cell type may be information such as a macro cell, a micro cell, or a femto cell. The cell attribute information may be whether a current cell and a neighboring cell of the current cell are co-sited, share an antenna and share a BBU; cell bandwidth may be a supported maximum data rate; a service attribute of a cell may be a supported service class, a supported quality of service class identifier QCI, cell channel bandwidth; access control information of a cell may be an access class AC, domain specific access control DSAC, paging permission with access control PPAC and whether being a cell reserved by a carrier.

The target radio access network information from the RNC to the unified control node of multiple standards may be carried in a common measurement response message or a common measurement report message, where the target radio access network information includes a destination cell identifier and/or requested cell information.

S1004: The unified control node of multiple standards sends the target radio access network information to the eNB.

If the first radio access network information request information from the eNB in S1001 further carries sending mode indication information, that is, indicating a mode for the second radio access network controller to send the target radio access network information to the first radio access network controller, the unified control node of multiple standards sends, according to an instruction of the sending mode indication information, the target radio access network information to the first radio access network controller. The sending mode may include sending randomly, sending once, sending multiple times, or sending periodically. A specific sending mode is similar to that in the description in the foregoing embodiment, which is not described repeatedly herein.

A specific form of the target radio access network information may be a base station subsystem general packet radio service protocol radio access network information management protocol data unit (BSSGP RIM PDU) defined in the 3GPP specification 48.018 and herein is a radio access network information protocol data unit RAN-INFORMATION PDU. In the RAN-INFORMATION PDU, a Source Cell Identifier source cell identifier is an identifier of an RNC or an identifier of a unified control node of multiple standards and a Destination Cell Identifier destination cell identifier is an identifier of an eNB; in a RIM Container radio access network information management container, a reported cell is a cell under an RNC.

Meanwhile, the unified control node of multiple standards may also store the target radio access network information. In this way, when another eNB requests the target radio access network information again, a macro base station may directly obtain the locally stored target radio access network information without obtaining the target radio access network information again.

In this embodiment, the eNB sends the first radio access network information request information to the unified control node of multiple standards, receives the target radio access network information obtained by the unified control node of multiple standards from the RNC and further stores the target radio access network information in the unified control node of multiple standards. The eNB may obtain the target radio access network information directly from the unified control node of multiple standards and the eNB does not need to obtain the target radio access network information from the RNC. In addition, the second radio access network controller is an intermediate node between the first radio access network controller and the third radio access network controller and the second radio access network controller performs centralized control and management on radio resources of the first radio access network standard and the second radio access network standard, thereby reducing a case where a core network entity transmits radio access network information, further reducing resource waste, improving a resource utilization rate and reducing a burden on a source core network entity and a target core network entity.

It should be noted that this embodiment is not limited to that the first radio access network controller is directly connected to the second radio access network controller by using an interface X2 for a connection between access network nodes of the first radio access network standard and the third radio access network controller is directly connected to the second radio access network controller by using an interface Iur for a connection between access network nodes of the second radio access network standard. Different radio access network controllers may further be connected by using different interfaces.

For example, the first radio access network controller is directly connected to the second radio access network controller by using an interface X2 for a connection between access network nodes of the first radio access network standard and the third radio access network controller is connected to the second radio access network controller by using an interface Iu for a connection between an access network node and a core network node that are of the second radio access network standard; or the first radio access network controller is connected to the second radio access network controller by using an interface S1 for a connection between an access network node and a core network node that are of the first radio access network standard and the third radio access network controller is directly connected to the second radio access network controller by using an interface Iur for a connection between access network nodes of the second radio access network standard; or the first radio access network controller is connected to the second radio access network controller by using an interface S1 for a connection between an access network node and a core network node that are of the first radio access network standard and the third radio access network controller is connected to the second radio access network controller by using an interface Iu for a connection between an access network node and a core network node that are of the second radio access network standard.

Figure 11:
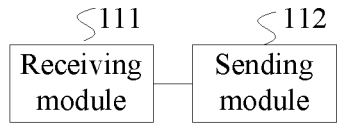
FIG. 11 is a schematic structural diagram of a radio access network controller according to an embodiment of the present invention.

FIG. 11 is a schematic structural diagram of a radio access network controller according to an embodiment of the present invention. As shown in FIG. 11, the radio access network controller includes a receiving module 111 and a sending module 112, where the receiving module 111 is configured to receive first radio access network information request information from a first radio access network controller, where the first radio access network information request information is used to request target radio access network information; the target radio access network information is radio access network information of a third radio access network controller; the first radio access network controller is an access network node of a first radio access network standard; and the third radio access network controller is an access network node of a second radio access network standard; and the sending module 112 is configured to send the target radio access network information to the first radio access network controller.

The radio access network controller according to this embodiment may be used to perform the procedure of the method embodiment shown in FIG. 1, where the implementation principles and technical effects thereof are similar and will not be described repeatedly herein.

Furthermore, the sending module 112 is further configured to send, before sending the target radio access network information to the first radio access network controller, second radio access network information request information to the third radio access network controller; and the receiving module 111 is further configured to receive, after the sending module 112 sends the second radio access network information request information to the third radio access network controller, the target radio access network information from the third radio access network controller. On such a basis, the sending module 112 is specifically configured to send the target radio access network information received by the receiving module 111 to the first radio access network controller.

Furthermore, the first radio access network information request information further carries sending mode indication information for indicating a mode for the second radio access network controller to send the target radio access network information to the first radio access network controller; and the sending module 112 is specifically configured to send, according to an instruction of the sending mode indication information received by the receiving module 111, the target radio access network information to the first radio access network controller.

Furthermore, the sending module 112 is specifically configured to send, according to the instruction of the sending mode indication information, the target radio access network information to the first radio access network controller at any moment; or the sending module 112 is specifically configured to send, according to the instruction of the sending mode indication information, the target radio access network information to the first radio access network controller only once; or the sending module 112 is specifically configured to send, according to the instruction of the sending mode indication information, the target radio access network information to the first radio access network controller when a change occurs on the radio access network information of the third radio access network controller; or the sending module 112 is specifically configured to send, according to the instruction of the sending mode indication information, the target radio access network information to the first radio access network controller periodically.

Furthermore, the radio access network controller may be an access network node of the first radio access network standard; or the radio access network controller may be an access network node of the second radio access network standard; or the radio access network controller is an intermediate node between the first radio access network controller and the third radio access network controller and does not belong to the first radio access network standard or the second radio access network standard.

Furthermore, the first radio access network controller is directly connected to the radio access network controller by using an interface for a connection between access network nodes of the first radio access network standard; or the first radio access network controller is connected to the radio access network controller by using an interface for a connection between an access network node and a core network node that are of the first radio access network standard.

Furthermore, the third radio access network controller is connected to the radio access network controller by using an interface for a connection between access network nodes of the second radio access network standard; or the third radio access network controller is connected to the radio access network controller by using an interface for a connection between an access network node and a core network node that are of the second radio access network standard.

Furthermore, the first radio access network information request information may further carry type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information may be carried in a common measurement request message, a resource status request message, a direct information transmission message, or a direct information transmission message of an evolved base station; or furthermore, the second radio access network information request information may be carried in a common measurement request message, a resource status request message, a direct information transmission message, or a direct information transmission message of an evolved base station.

Furthermore, the target radio access network information is carried in a common measurement response message, a common measurement report message, a resource status response message, a resource status update message, or a direct transmission message of a mobility management entity.

Figure 12:
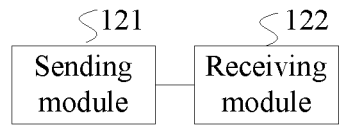
FIG. 12 is a schematic structural diagram of a radio access network controller according to another embodiment of the present invention.

FIG. 12 is a schematic structural diagram of a radio access network controller according to another embodiment of the present invention. As shown in FIG. 12, the radio access network controller includes a sending module 121 and a receiving module 122, where the sending module 121 is configured to send first radio access network information request information to a second radio access network controller, where the first radio access network information request information is used to request target radio access network information; the target radio access network information is radio access network information of a third radio access network controller; the radio access network controller is an access network node of a first radio access network standard; and the third radio access network controller is an access network node of a second radio access network standard; and the receiving module 122 is configured to receive, after the sending module 121 sends the first radio access network information request information to the second radio access network controller, the target radio access network information from the second radio access network controller.

The radio access network controller according to this embodiment may be used to perform the procedure of the method embodiment shown in FIG. 2, where the implementation principles and technical effects thereof are similar and will not be described repeatedly herein.

Furthermore, the first radio access network information request information carries sending mode indication information for indicating a mode for the second radio access network controller to send the target radio access network information to the radio access network controller; and the receiving module 122 is specifically configured to receive the target radio access network information that is from the second radio access network controller according to an instruction of the sending mode indication information.

Furthermore, the second radio access network controller is an access network node of the first radio access network standard; or the second radio access network controller is an access network node of the second radio access network standard; or the second radio access network controller is an intermediate node between the radio access network controller and the third radio access network controller and does not belong to the first radio access network standard or the second radio access network standard.

Furthermore, the radio access network controller is directly connected to the second radio access network controller by using an interface for a connection between access network nodes of the first radio access network standard; or the radio access network controller is connected to the second radio access network controller by using an interface for a connection between an access network node and a core network node that are of the first radio access network standard.

Furthermore, the third radio access network controller is connected to the second radio access network controller by using an interface for a connection between access network nodes of the second radio access network standard; or the third radio access network controller is connected to the second radio access network controller by using an interface for a connection between an access network node and a core network node that are of the second radio access network standard.

Furthermore, the first radio access network information request information further carries type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information is carried in a common measurement request message, a resource status request message, a direct information transmission message, or a direct information transmission message of an evolved base station; or furthermore, the second radio access network information request information is carried in a common measurement request message, a resource status request message, a direct information transmission message, or a direct information transmission message of an evolved base station.

Furthermore, the target radio access network information is carried in a common measurement response message, a common measurement report message, a resource status response message, a resource status update message, or a direct transmission message of a mobility management entity.

Figure 13:
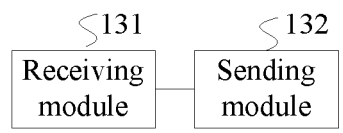
FIG. 13 is a schematic structural diagram of a radio access network controller according to another embodiment of the present invention.

FIG. 13 is a schematic structural diagram of a radio access network controller according to another embodiment of the present invention. As shown in FIG. 13, the radio access network controller includes a receiving module 131 and a sending module 132, where the receiving module 131 is configured to receive radio access network information request information from a first radio access network controller, where the radio access network information request information is used to request target radio access network information; the target radio access network information is radio access network information of the radio access network controller; and the first radio access network controller and the radio access network controller are access network nodes of different radio access network standards; and the sending module 132 is configured to send, after the receiving module 131 receives the radio access network information request information from the first radio access network controller, the target radio access network information to the first radio access network controller.

The radio access network controller according to this embodiment may be used to perform the procedure of the method embodiment shown in FIG. 6, where the implementation principles and technical effects thereof are similar and will not be described repeatedly herein.

Furthermore, the radio access network information request information further carries sending mode indication information for indicating a mode for the radio access network controller to send the target radio access network information to the first radio access network controller; and the sending module 132 is specifically configured to send, according to an instruction of the sending mode indication information, the target radio access network information to the first radio access network controller.

Furthermore, the sending module 132 is specifically configured to send, according to the instruction of the sending mode indication information, the target radio access network information to the first radio access network controller at any moment; or the sending module 132 is specifically configured to send, according to the instruction of the sending mode indication information, the target radio access network information to the first radio access network controller only once; or the sending module 132 is specifically configured to send, according to the instruction of the sending mode indication information, the target radio access network information to the first radio access network controller when a change occurs on the radio access network information of the third radio access network controller; or the sending module 132 is specifically configured to send, according to the instruction of the sending mode indication information, the target radio access network information to the first radio access network controller periodically.

Furthermore, the radio access network information request information further carries type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information is carried in a common measurement request message, a resource status request message, a direct information transmission message, or a direct information transmission message of an evolved base station; or the target radio access network information is carried in a common measurement response message, a common measurement report message, a resource status response message, a resource status update message, or a direct transmission message of a mobility management entity.

Figure 14:
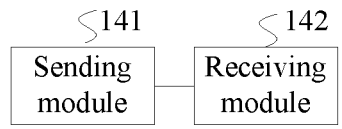
FIG. 14 is a schematic structural diagram of a radio access network controller according to another embodiment of the present invention.

FIG. 14 is a schematic structural diagram of a radio access network controller according to another embodiment of the present invention. As shown in FIG. 14, the radio access network controller includes a sending module 141 and a receiving module 142, where the sending module 141 is configured to send radio access network information request information to a second radio access network controller, where the radio access network information request information is used to request target radio access network information; the target radio access network information is radio access network information of the second radio access network controller; and the radio access network controller and the second radio access network controller are access network nodes of different radio access network standards; and the receiving module 142 is configured to receive, after the sending module 141 sends the radio access network information request information to the second radio access network controller, the target radio access network information from the second radio access network controller.

The radio access network controller according to this embodiment may be used to perform the procedure of the method embodiment shown in FIG. 7, where the implementation principles and technical effects thereof are similar and will not be described repeatedly herein.

Furthermore, the radio access network information request information further carries sending mode indication information for indicating a mode for the second radio access network controller to send the target radio access network information to the radio access network controller; and the receiving module 142 is further configured to receive the target radio access network information that is from the second radio access network controller according to an instruction of the sending mode indication information.

Furthermore, the radio access network information request information further carries type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information may be carried in a common measurement request message, a resource status request message, a direct information transmission message, or a direct information transmission message of an evolved base station; or furthermore, the target radio access network information may be carried in a common measurement response message, a common measurement report message, a resource status response message, a resource status update message, or a direct transmission message of a mobility management entity.

Figure 15:
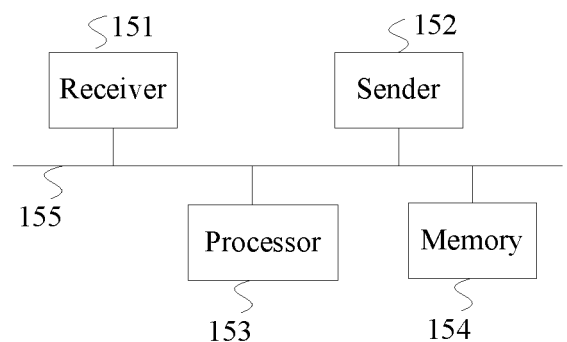
FIG. 15 is a schematic structural diagram of a radio access network controller according to another embodiment of the present invention.

FIG. 15 is a schematic structural diagram of a radio access network controller according to another embodiment of the present invention. As shown in FIG. 15, the radio access network controller includes a receiver 151, a sender 152, a processor 153, a memory 154 and at least one communication bus 155. The processor 153 may be a central processing unit (CPU). The communication bus 155 is configured to implement connections and communication between these apparatuses. The memory 154 may include a high-speed RAM memory and may further include a non-volatile memory, such as at least one disk memory. The memory 154 may optionally include at least one storage apparatus far away from the processor 153.

The receiver 151 is configured to receive first radio access network information request information from a first radio access network controller, where the first radio access network information request information is used to request target radio access network information; the target radio access network information is radio access network information of a third radio access network controller; the first radio access network controller is an access network node of a first radio access network standard; and the third radio access network controller is an access network node of a second radio access network standard. The sender 152 is configured to send, in a case where the target radio access network information exists locally, i.e. on the radio access network controller, the target radio access network information to the first radio access network controller.

The radio access network controller according to this embodiment may be used to perform the procedure of the method embodiment shown in FIG. 1, where the implementation principles and technical effects thereof are similar and will not be described repeatedly herein.

Furthermore, the sender 152 is further configured to send, after the receiver 151 receives the first radio access network information request information from the first radio access network controller and before the target radio access network information to the first radio access network controller is sent, second radio access network information request information to the third radio access network controller according to the radio access network information of the third radio access network controller; and the receiver 151 is further configured to receive, after the sender 152 sends the second radio access network information request information to the third radio access network controller, the target radio access network information from the third radio access network controller. On such a basis, the sender 152 is specifically configured to send the target radio access network information received by the receiver 151 to the first radio access network controller.

Furthermore, the first radio access network information request information further carries sending mode indication information for indicating a mode for the radio access network controller to send the target radio access network information to the first radio access network controller; and the sender 152 is specifically configured to send, according to an instruction of the sending mode indication information received by the receiver 151, the target radio access network information to the first radio access network controller.

Furthermore, the sender 152 is specifically configured to send, according to the instruction of the sending mode indication information, the target radio access network information to the first radio access network controller at any moment; or the sender 152 is specifically configured to send, according to the instruction of the sending mode indication information, the target radio access network information to the first radio access network controller only once; or the sender 152 is specifically configured to send, according to the instruction of the sending mode indication information, the target radio access network information to the first radio access network controller when a change occurs on the radio access network information of the third radio access network controller; or the sender 152 is specifically configured to send, according to the instruction of the sending mode indication information, the target radio access network information to the first radio access network controller periodically.

Furthermore, the radio access network controller may be an access network node of the first radio access network standard; or the radio access network controller may be an access network node of the second radio access network standard; or the radio access network controller is an intermediate node between the first radio access network controller and the third radio access network controller and does not belong to the first radio access network standard or the second radio access network standard.

Furthermore, the first radio access network controller is directly connected to the radio access network controller by using an interface for a connection between access network nodes of the first radio access network standard; or the first radio access network controller is connected to the radio access network controller by using an interface for a connection between an access network node and a core network node that are of the first radio access network standard.

Furthermore, the third radio access network controller is connected to the radio access network controller by using an interface for a connection between access network nodes of the second radio access network standard; or the third radio access network controller is connected to the radio access network controller by using an interface for a connection between an access network node and a core network node that are of the second radio access network standard.

Furthermore, the first radio access network information request information may further carry type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information may be carried in a common measurement request message, a resource status request message, a direct information transmission message, or a direct information transmission message of an evolved base station; or furthermore, the second radio access network information request information may be carried in a common measurement request message, a resource status request message, a direct information transmission message, or a direct information transmission message of an evolved base station.

Furthermore, the target radio access network information may be carried in a common measurement response message, a common measurement report message, a resource status response message, a resource status update message, or a direct transmission message of a mobility management entity.

Figure 16:
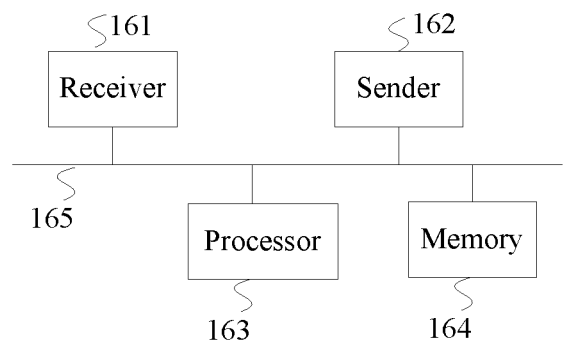
FIG. 16 is a schematic structural diagram of a radio access network controller according to another embodiment of the present invention.

FIG. 16 is a schematic structural diagram of a radio access network controller according to another embodiment of the present invention. As shown in FIG. 16, the radio access network controller includes a sender 161, a receiver 162, a processor 163, a memory 164 and at least one communication bus 165. The processor 163 may be a central processing unit (CPU). The communication bus 165 is configured to implement connections and communication between these apparatuses. The memory 164 may include a high-speed RAM memory and may further include a non-volatile memory, such as at least one disk memory. The memory 164 may optionally include at least one storage apparatus far away from the processor 163.

The sender 161 is configured to send first radio access network information request information to a second radio access network controller, where the first radio access network information request information is used to request target radio access network information; the target radio access network information is radio access network information of a third radio access network controller; the radio access network controller is an access network node of a first radio access network standard; and the third radio access network controller is an access network node of a second radio access network standard; and the receiver 162 is configured to receive, after the sender 161 sends the first radio access network information request information to the second radio access network controller, the target radio access network information from the second radio access network controller.

The radio access network controller according to this embodiment may be used to perform the procedure of the method embodiment shown in FIG. 2, where the implementation principles and technical effects thereof are similar and will not be described repeatedly herein.

Furthermore, the first radio access network information request information carries sending mode indication information for indicating a mode for the second radio access network controller to send the target radio access network information to the radio access network controller; and the receiver 162 is specifically configured to receive the target radio access network information that is from the second radio access network controller according to an instruction of the sending mode indication information.

Furthermore, the second radio access network controller is an access network node of the first radio access network standard; or the second radio access network controller is an access network node of the second radio access network standard; or the second radio access network controller is an intermediate node between the radio access network controller and the third radio access network controller and does not belong to the first radio access network standard or the second radio access network standard.

Furthermore, the radio access network controller is directly connected to the second radio access network controller by using an interface for a connection between access network nodes of the first radio access network standard; or the radio access network controller is connected to the second radio access network controller by using an interface for a connection between an access network node and a core network node that are of the first radio access network standard.

Furthermore, the third radio access network controller is connected to the second radio access network controller by using an interface for a connection between access network nodes of the second radio access network standard; or the third radio access network controller is connected to the second radio access network controller by using an interface for a connection between an access network node and a core network node that are of the second radio access network standard.

Furthermore, the first radio access network information request information further carries type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information may be carried in a common measurement request message, a resource status request message, a direct information transmission message, or a direct information transmission message of an evolved base station.

Furthermore, the second radio access network information request information may be carried in a common measurement request message, a resource status request message, a direct information transmission message, or a direct information transmission message of an evolved base station.

Furthermore, the target radio access network information may be carried in a common measurement response message, a common measurement report message, a resource status response message, a resource status update message, or a direct transmission message of a mobility management entity.

Figure 17:
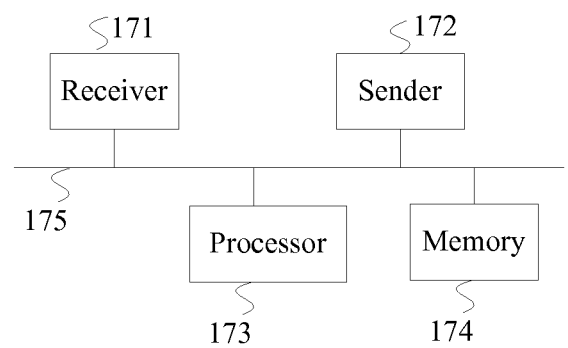
FIG. 17 is a schematic structural diagram of a radio access network controller according to another embodiment of the present invention.

FIG. 17 is a schematic structural diagram of a radio access network controller according to another embodiment of the present invention. As shown in FIG. 17, the radio access network controller includes a receiver 171, a sender 172, a processor 173, a memory 174 and at least one communication bus 175. The processor 173 may be a central processing unit (CPU). The communication bus 175 is configured to implement connections and communication between these apparatuses. The memory 174 may include a high-speed RAM memory and may further include a non-volatile memory, such as at least one disk memory. The memory 174 may optionally include at least one storage apparatus far away from the processor 173.

The receiver 171 is configured to receive radio access network information request information from a first radio access network controller, where the radio access network information request information is used to request target radio access network information; the target radio access network information is radio access network information of the radio access network controller; and the first radio access network controller and the radio access network controller are access network nodes of different radio access network standards; and the sender 172 is configured to send, after the receiver 171 receives the radio access network information request information from the first radio access network controller, the target radio access network information to the first radio access network controller.

The radio access network controller according to this embodiment may be used to perform the procedure of the method embodiment shown in FIG. 6, where the implementation principles and technical effects thereof are similar and will not be described repeatedly herein.

Furthermore, the radio access network information request information further carries sending mode indication information for indicating a mode for the radio access network controller to send the target radio access network information to the first radio access network controller; and the sender 172 is specifically configured to send, according to an instruction of the sending mode indication information, the target radio access network information to the first radio access network controller.

Furthermore, the sender 172 is specifically configured to send, according to the instruction of the sending mode indication information, the target radio access network information to the first radio access network controller at any moment; or the sender 172 is specifically configured to send, according to the instruction of the sending mode indication information, the target radio access network information to the first radio access network controller only once; or the sender 172 is specifically configured to send, according to the instruction of the sending mode indication information, the target radio access network information to the first radio access network controller when a change occurs on the radio access network information of the third radio access network controller; or the sender 172 is specifically configured to send, according to the instruction of the sending mode indication information, the target radio access network information to the first radio access network controller periodically.

Furthermore, the radio access network information request information further carries type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information may be carried in a common measurement request message, a resource status request message, a direct information transmission message, or a direct information transmission message of an evolved base station.

Furthermore, the target radio access network information may be carried in a common measurement response message, a common measurement report message, a resource status response message, a resource status update message, or a direct transmission message of a mobility management entity.

Figure 18:
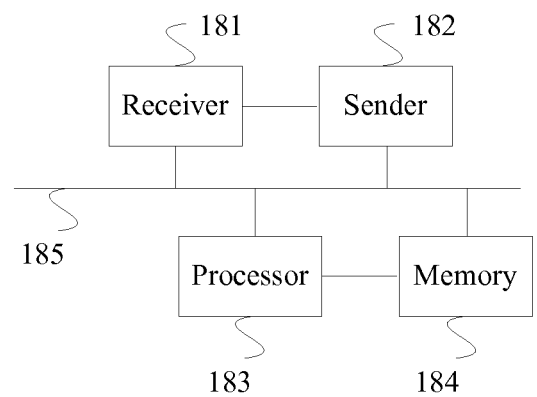
FIG. 18 is a schematic structural diagram of a radio access network controller according to another embodiment of the present invention.

FIG. 18 is a schematic structural diagram of a radio access network controller according to another embodiment of the present invention. As shown in FIG. 18, the radio access network controller includes a sender 181, a receiver 182, a processor 183, a memory 184 and at least one communication bus 185. The processor 183 may be a central processing unit (CPU). The communication bus 185 is configured to implement connections and communication between these apparatuses. The memory 184 may include a high-speed RAM memory and may further include a non-volatile memory, such as at least one disk memory. The memory 184 may optionally include at least one storage apparatus far away from the processor 183.

The sender 181 is configured to send radio access network information request information to a second radio access network controller, where the radio access network information request information is used to request target radio access network information; the target radio access network information is radio access network information of the second radio access network controller; and the radio access network controller and the second radio access network controller are access network nodes of different radio access network standards; and the receiver 182 is configured to receive, after the sender 181 sends the radio access network information request information to the second radio access network controller, the target radio access network information from the second radio access network controller.

The radio access network controller according to this embodiment may be used to perform the procedure of the method embodiment shown in FIG. 7, where the implementation principles and technical effects thereof are similar and will not be described repeatedly herein.

Furthermore, the radio access network information request information further carries sending mode indication information for indicating a mode for the second radio access network controller to send the target radio access network information to the radio access network controller; and the receiver 182 is further configured to receive the target radio access network information that is from the second radio access network controller according to an instruction of the sending mode indication information.

Furthermore, the radio access network information request information further carries type indication information for indicating a type of the target radio access network information.

Furthermore, the target radio access network information includes at least one of network assisted cell change information, system information, multimedia broadcast and multicast service data channel information, self-organizing network transmission information, universal terrestrial radio access system information, an equivalent public land mobile network identifier of a cell, a type of a service borne by a cell, a cell type, access restriction information of a cell, cell capability information, universal terrestrial radio access information, a self-organizing network information and a multimedia broadcast and multicast service information.

Furthermore, the first radio access network information request information may be carried in a common measurement request message, a resource status request message, a direct information transmission message, or a direct information transmission message of an evolved base station.

Furthermore, the target radio access network information may be carried in a common measurement response message, a common measurement report message, a resource status response message, a resource status update message, or a direct transmission message of a mobility management entity.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as such modifications or replacements do not cause the essence of corresponding technical solutions to depart from the scope of the technical solutions of the embodiments of the present invention.

What is claimed is:

1. A method for obtaining radio access network information, comprising:
   receiving, by a second radio access network controller, first radio access network information request information from a first radio access network controller;
   providing a first radio access network controller that is an access network node of a first radio access network standard;
   providing target radio access network information that is radio access network information of a third radio access network controller, the third radio access network controller being an access network node of a second radio access network standard;
   using the first radio access network information request information to request the target radio access network information by using a first core network node of the second radio access network standard, or by using a second core network node of the first radio access network standard and the first core network node of the second radio access network standard; and
   sending, by the second radio access network controller, the target radio access network information to the first radio access network controller.

2. The method for obtaining radio access network information according to claim 1, wherein the method further comprises:
   sending, by the second radio access network controller, second radio access network information request information to the third radio access network controller; and
   receiving, by the second radio access network controller, the target radio access network information from the third radio access network controller.

3. The method for obtaining radio access network information according to claim 1, wherein the first radio access network information request information further carries sending mode indication information for indicating a mode for the second radio access network controller to send the target radio access network information to the first radio access network controller; and
   the method further comprises at least one of:
   sending, by the second radio access network controller according to the instruction of the sending mode indication information, the target radio access network information to the first radio access network controller;
   sending, by the second radio access network controller according to the instruction of the sending mode indication information, the target radio access network information to the first radio access network controller only once;
   sending, by the second radio access network controller according to the instruction of the sending mode indication information, the target radio access network information to the first radio access network controller when a change occurs on the radio access network information of the third radio access network controller; and
   sending, by the second radio access network controller according to the instruction of the sending mode indication information, the target radio access network information to the first radio access network controller periodically.

4. The method for obtaining radio access network information according to claim 1, wherein the first radio access network information request information further carries type indication information for indicating a type of the target radio access network information.

5. A method for obtaining radio access network information, comprising:
   sending, by a first radio access network controller, first radio access network information request information to a second radio access network controller, the first radio access network controller being an access network node of a first radio access network standard;
   providing target radio access network information that is radio access network information of a third radio access network controller;
   providing a third radio access network controller that is an access network node of a second radio access network standard;
   using the first radio access network information request information to request target radio access network information by using a first core network node of the second radio access network standard, or by using a second core network node of the first radio access network standard and the first core network node of the second radio access network standard; and
   receiving, by the first radio access network controller, the target radio access network information from the second radio access network controller.

6. The method for obtaining radio access network information according to claim 5, wherein the first radio access network information request information carries sending mode indication information for indicating a mode for the second radio access network controller to send the target radio access network information to the first radio access network controller; and
   the method further comprises:
   receiving, by the first radio access network controller, the target radio access network information that is from the second radio access network controller according to an instruction of the sending mode indication information.

7. The method for obtaining radio access network information according to claim 5, wherein the first radio access network information request information further carries type indication information for indicating a type of the target radio access network information.

8. A method for obtaining radio access network information, comprising:
   receiving, by a second radio access network controller, radio access network information request information from a first radio access network controller, the first radio access network controller and the second radio access network controller being access network nodes of different radio access network standards;
   providing target radio access network information that is radio access network information of the second radio access network controller;
   using the radio access network information request information to the request target radio access network information by using a first core network node of the second radio access network standard, or by using a second core network node of the first radio access network standard and the first core network node of the second radio access network standard; and sending, by the second radio access network controller, the target radio access network information to the first radio access network controller.

9. The method for obtaining radio access network information according to claim 8, wherein the radio access network information request information further carries sending mode indication information for indicating a mode for the second radio access network controller to send the target radio access network information to the first radio access network controller; and the method further comprises at least one of:
sending, by the second radio access network controller according to the instruction of the sending mode indication information, the target radio access network information to the first radio access network controller;
sending, by the second radio access network controller according to the instruction of the sending mode indication information, the target radio access network information to the first radio access network controller only once;
sending, by the second radio access network controller according to the instruction of the sending mode indication information, the target radio access network information to the first radio access network controller when a change occurs on the radio access network information of the second radio access network controller; and
sending, by the second radio access network controller according to the instruction of the sending mode indication information, the target radio access network information to the first radio access network controller periodically.

10. The method for obtaining radio access network information according to claim 8, wherein the radio access network information request information further carries type indication information for indicating a type of the target radio access network information.

11. A method for obtaining radio access network information, comprising:
sending, by a first radio access network controller, radio access network information request information to a second radio access network controller, the first radio access network controller and the second radio access network controller being access network nodes of different radio access network standards;
providing target radio access network information that is radio access network information of the second radio access network controller;
using the radio access network information request information to request the target radio access network information by using a first core network node of a second radio access network standard, or by using a second core network node of a first radio access network standard and the first core network node of the second radio access network standard; and
receiving, by the first radio access network controller, the target radio access network information from the second radio access network controller.

12. The method for obtaining radio access network information according to claim 11, wherein the radio access network information request information further carries sending mode indication information for indicating a mode for the second radio access network controller to send the target radio access network information to the first radio access network controller; and
the method further comprises:
receiving, by the first radio access network controller, the target radio access network information that is from the second radio access network controller according to an instruction of the sending mode indication information.

13. The method for obtaining radio access network information according to claim 11, wherein the radio access network information request information further carries type indication information for indicating a type of the target radio access network information.

14. A radio access network controller, comprising:
a memory; and
a processor coupled to the memory and configured to:
receive first radio access network information request information from a first radio access network controller, the first radio access network controller being an access network node of a first radio access network standard;
provide target radio access network information that is radio access network information of a third radio access network controller, the third radio access network controller being an access network node of a second radio access network standard;
use the first radio access network information request information to request the target radio access network information by using a first core network node of the second radio access network standard, or by using a second core network node of the first radio access network standard and the first core network node of the second radio access network standard; and
send the target radio access network information to the first radio access network controller.

15. The radio access network controller according to claim 14, wherein
the processor is further configured to send, before sending the target radio access network information, second radio access network information request information to the third radio access network controller; and send, after the processor receives the target radio access network information from the third radio access network controller, the target radio access network information to the first radio access network controller; and
the processor is further configured to receive, after the processor sends the second radio access network information request information to the third radio access network controller, the target radio access network information from the third radio access network controller.

16. The radio access network controller according to claim 14, wherein the first radio access network information request information further carries sending mode indication information for indicating a mode for the radio access network controller to send the target radio access network information to the first radio access network controller; and
the processor is further configured to perform at least one of:
sending, according to the instruction of the sending mode indication information, the target radio access network information to the first radio access network controller only once;
sending, according to the instruction of the sending mode indication information, the target radio access network information to the first radio access network controller when a change occurs on the radio access network information of the third radio access network controller; and sending, according to the instruction of the sending mode indication information, the target radio access network information to the first radio access network controller periodically.

17. The radio access network controller according to claim 14, wherein the radio access network controller is one of an access network node of the first radio access network standard, an access network node of the second radio access network standard and an intermediate node between the first radio access network controller and the third radio access network controller; and the radio access network controller further comprises:
 a processor, configured to performs centralized control and management on radio resources of the first radio access network standard and the second radio access network standard.

18. The radio access network controller according to claim 14, wherein the first radio access network information request information further carries type indication information for indicating a type of the target radio access network information.

19. A radio access network controller, comprising:
 a memory; and
 a processor coupled to the memory and configured to:
 send first radio access network information request information to a second radio access network controller;
 provide target radio access network information that is radio access network information of a third radio access network controller, the radio access network controller being an access network node of the first radio access network standard, and the third radio access network controller being an access network node of the second radio access network standard;
 use the first radio access network information request information to request the target radio access network information by using a first core network node of the second radio access network standard, or by using a second core network node of the first radio access network standard and the first core network node of the second radio access network standard; and
 receive, after the processor sends the first radio access network information request information to the second radio access network controller, the target radio access network information from the second radio access network controller.

20. The radio access network controller according to claim 19, wherein the first radio access network information request information carries sending mode indication information for indicating a mode for the second radio access network controller to send the target radio access network information to the radio access network controller; and
 the processor is further configured to receive the target radio access network information that is from the second radio access network controller according to an instruction of the sending mode indication information.

21. The radio access network controller according to claim 19, wherein the second radio access network controller is one of an access network node of the first radio access network standard, an access network node of the second radio access network standard and an intermediate node between the radio access network controller and the third radio access network controller; and the second radio access network controller is further configured to perform centralized control and management on radio resources of the first radio access network standard and the second radio access network standard.

22. The radio access network controller according to claim 19, wherein the first radio access network information request information further carries type indication information for indicating a type of the target radio access network information.

23. A radio access network controller, comprising:
 a memory; and
 a processor coupled to the memory and configured to:
 receive radio access network information request information from a first radio access network controller;
 provide target radio access network information that is radio access network information of the radio access network controller;
 use the radio access network information request information to request target radio access network information by using a first core network node of a second radio access network standard, or by using a second core network node of a first radio access network standard and the first core network node of the second radio access network standard, the first radio access network controller and the radio access network controller being access network nodes of different radio access network standards; and
 send, after the processor receives the radio access network information request information from the first radio access network controller, the target radio access network information to the first radio access network controller.

24. The radio access network controller according to claim 23, wherein the radio access network information request information further carries sending mode indication information for indicating a mode for the radio access network controller to send the target radio access network information to the first radio access network controller; and
 the processor is further configured to perform at least one of:
 sending, according to the instruction of the sending mode indication information, the target radio access network information to the first radio access network controller;
 sending, according to the instruction of the sending mode indication information, the target radio access network information to the first radio access network controller only once;
 sending, according to the instruction of the sending mode indication information, the target radio access network information to the first radio access network controller when a change occurs on the radio access network information of the second radio access network controller; and
 sending, according to the instruction of the sending mode indication information, the target radio access network information to the first radio access network controller periodically.

25. The radio access network controller according to claim 23, wherein the radio access network information request information further carries type indication information for indicating a type of the target radio access network information.

26. A radio access network controller, comprising:
 a memory; and
 a processor coupled to the memory and configured to:
 send radio access network information request information to a second radio access network controller;
 provide target radio access network information that is radio access network information of the second radio access network controller, the radio access network controller and the second radio access network controller being access network nodes of different radio access network standards;

use the radio access network information request information to request the target radio access network information by using a first core network node of the second radio access network standard, or by using a second core network node of the first radio access network standard and the first core network node of the second radio access network standard; and receive, after the processor sends the radio access network information request information to the second radio access network controller, the target radio access network information from the second radio access network controller.

27. The radio access network controller according to claim 26, wherein the radio access network information request information further carries sending mode indication information for indicating a mode for the second radio access network controller to send the target radio access network information to the radio access network controller; and the processor is further configured to receive the target radio access network information that is from the second radio access network controller according to an instruction of the sending mode indication information.

28. The radio access network controller according to claim 26, wherein the first radio access network information request information further carries type indication information for indicating a type of the target radio access network information.

* * * * *